US009859947B2

(12) United States Patent
Lee et al.

(10) Patent No.: US 9,859,947 B2
(45) Date of Patent: Jan. 2, 2018

(54) TERMINAL ELIMINATING HARMONIC COMPONENTS AND INTERMODULATION DISTORTIONS COMPONENT

(71) Applicant: LG ELECTRONICS INC., Seoul (KR)

(72) Inventors: Sangwook Lee, Seoul (KR); Suhwan Lim, Seoul (KR); Dongik Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/032,991

(22) PCT Filed: Nov. 11, 2014

(86) PCT No.: PCT/KR2014/010772
§ 371 (c)(1),
(2) Date: Apr. 28, 2016

(87) PCT Pub. No.: WO2015/072715
PCT Pub. Date: May 21, 2015

(65) Prior Publication Data
US 2016/0285505 A1  Sep. 29, 2016

Related U.S. Application Data

(60) Provisional application No. 61/903,898, filed on Nov. 13, 2013.

(51) Int. Cl.
*H04B 1/40* (2015.01)
*H04B 1/525* (2015.01)
(Continued)

(52) U.S. Cl.
CPC ......... *H04B 1/525* (2013.01); *H04B 1/0057* (2013.01); *H04B 1/62* (2013.01); *H04L 5/14* (2013.01)

(58) Field of Classification Search
USPC ................ 370/329, 277, 311; 455/552.1, 84
See application file for complete search history.

(56) References Cited

U.S. PATENT DOCUMENTS 9,124,355 B2 * 9/2015 Black ................ H04B 1/525
2004/0266378 A1 12/2004 Fukamachi et al.
(Continued)

FOREIGN PATENT DOCUMENTS

JP  2003-133989 A  1/2013
KR  10-2013-0010104 A  1/2013
(Continued)

*Primary Examiner* — Eva Puente
(74) *Attorney, Agent, or Firm* — Birch, Stewart, Kolasch & Birch, LLP

(57) ABSTRACT

A terminal is disclosed by the present specification. The terminal may comprise: an antenna; a diplexer for compounding a carrier of a first band and a carrier of a second band and for connecting or disconnecting the same to the antenna; a filter connected to the diplexer, a first duplexer connected to the filter for separating transmissions and receptions in the carrier of the first band; and a second duplexer connected to the diplexer for separating transmissions and receptions in the carrier of the second band. To this end, the filter can eliminate harmonic components and intermodulation distortions (IMD) that occur when transmission in the carrier of the first band and transmission in the carrier of the second band are simultaneously performed.

8 Claims, 24 Drawing Sheets

(51) Int. Cl.
  *H04B 1/62* (2006.01)
  *H04B 1/00* (2006.01)
  *H04L 5/14* (2006.01)

(56) References Cited

U.S. PATENT DOCUMENTS

| | | |
|---|---|---|
| 2012/0009887 A1 | 1/2012 | Sanguinetti et al. |
| 2012/0113874 A1* | 5/2012 | Sanguinetti ............ H04B 1/525 370/277 |
| 2012/0178386 A1* | 7/2012 | Pascolini ............... H04B 1/525 455/84 |
| 2013/0016633 A1 | 1/2013 | Lum et al. |
| 2013/0028147 A1* | 1/2013 | Black ..................... H04B 1/109 370/277 |
| 2013/0063224 A1 | 3/2013 | Saji |
| 2013/0172056 A1 | 7/2013 | Kim |
| 2014/0153498 A1* | 6/2014 | Rousu .................... H04W 8/24 370/329 |
| 2014/0159779 A1* | 6/2014 | Napoles .............. B81C 1/00976 327/111 |
| 2015/0105120 A1* | 4/2015 | Lim .................. H04W 36/0022 455/552.1 |
| 2016/0157187 A1* | 6/2016 | Zhu .................... H04W 52/243 370/311 |

FOREIGN PATENT DOCUMENTS

| | | |
|---|---|---|
| KR | 10-2013-0028656 A | 3/2013 |
| KR | 10-2013-0079847 A | 7/2013 |

\* cited by examiner

FIG. 10
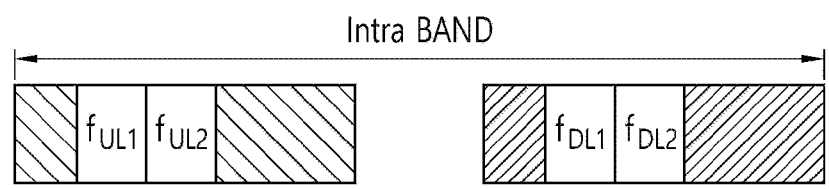
(a)
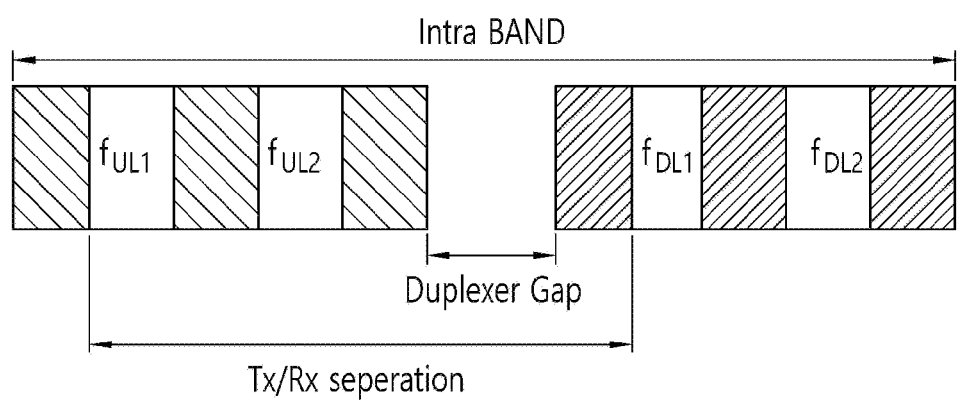
(b)

TERMINAL ELIMINATING HARMONIC COMPONENTS AND INTERMODULATION DISTORTIONS COMPONENT

CROSS REFERENCE TO RELATED APPLICATIONS

This application is the National Phase of PCT International Application No. PCT/KR2014/010772, filed on Nov. 11, 2014, which claims priority under 35 U.S.C. 119(e) to U.S. Provisional Application No. 61/903,898, filed on Nov. 13, 2013, all of which are hereby expressly incorporated by reference into the present application.

BACKGROUND OF THE INVENTION

Field of the Invention

The present invention relates to a terminal for mobile communications, for example, LTE-A standard.

Discussion of the Related Art

3GPP (3rd Generation Partnership Project) LTE (Long Term Evolution) that is an advancement of UMTS (Universal Mobile Telecommunication System) is being introduced with 3GPP release 8.

In 3GPP LTE, OFDMA (orthogonal frequency division multiple access) is used for downlink, and SC-FDMA (single carrier-frequency division multiple access) is used for uplink. To understand OFDMA, OFDM should be known. OFDM may attenuate inter-symbol interference with low complexity and is in use. OFDM converts data serially input into N parallel data pieces and carries the data pieces over N orthogonal sub-carriers. The sub-carriers maintain orthogonality in view of frequency. Meanwhile, OFDMA refers to a multiple access scheme that realizes multiple access by independently providing each user with some of sub-carriers available in the system that adopts OFDM as its modulation scheme.

FIG. 1 illustrates a 3GPP LTE wireless communication system.

As can be seen from FIG. 1, the wireless communication system includes at least one base station (BS) 20. Each base station 20 offers a communication service in a specific geographical area (generally denoted cell) 20a, 20b, and 20c.

At this time, communication from the base station to a terminal is denoted downlink (DL), and communication from the terminal to the base station is denoted uplink (UL).

In case that base stations of several service carriers are existed in each geographic areas 20a, 20b and 20c, interferences may occur between the base stations.

In addition, in case that a terminal transmits a carrier of a first band and a carrier of a second band simultaneously using the carrier aggregation (CA) of LTE-A technology, harmonic components and intermodulation distortion (IMD) component occur, which cause interferences in the satellite navigation band and the industrial scientific medical (ISM) band.

SUMMARY OF THE INVENTION

Accordingly, disclosures of the specification have been made in an effort to solve the aforementioned problem.

To achieve the aforementioned aim, one disclosure of the present specification provides a terminal. The terminal may comprise: an antenna; a diplexer configured to combine a carrier for a first band and a carrier for a second band, to connect or to disconnect the same to the antenna; a filter connected between the antenna and the diplexer; a first duplexer connected to the filter, and configured to separate a transmission and a reception on the carrier of the first band; and a second duplexer connected to the filter, and configured to separate a transmission and a reception on the carrier of the second band. Here, the filter removes a harmonic component and an IMD component generated in case that a transmission on the carrier of the first band and a transmission on the carrier of the second band are simultaneously performed.

The carrier of the first band may be a low frequency band carrier based on LTE/LTE-A, and the carrier of the second band may be a high frequency band carrier based on LTE/LTE-A. In more detail, the carrier of the first band may be band 5 based on LTE/LTE-A, and the carrier of the second band may be band 1 based on LTE/LTE-A.

The filter may remove the harmonic component and the IMD component causing an interference in WLAN that uses an industrial scientific medical (ISM).

An insertion loss caused by the filter may be absorbed in a margin of reference sensitivity in case of a reception and is absorbed in a margin of maximum output power in case of a transmission, whereby a reduction of cell coverage is prevented.

To achieve the aforementioned aim, one disclosure of the present specification provides a terminal. The terminal may comprise: an antenna; a switch configured to selectively coupling a carrier with the antenna; one or more diplexers connected to the switch, and configured to separate a transmission and a reception on a carrier of middle band; a diplexer connected to the switch, and configured to separate and synthesize a carrier of low frequency band and a carrier of high frequency band; a filter connected between the switch and the diplexer; a low frequency band duplexer connected to the diplexer, and configured to separate a transmission and a reception on the carrier of the low frequency band; and a high frequency band duplexer connected to the diplexer, and configured to separate a transmission and a reception on the carrier of the high frequency band. Here, the filter may remove a harmonic component and an IMD component generated in case that a transmission on the carrier of the low frequency band and a transmission on the carrier of the high frequency band are simultaneously performed.

According to disclosures of the present specification, the harmonic components and the intermodulation distortion (IMD) component can be removed, which occur in case that a transmission on a carrier of low frequency band and a transmission on a carrier of high frequency band are simultaneously performed.

BRIEF DESCRIPTION OF THE DRAWINGS

FIG. 10 is a concept view illustrating intra-band carrier aggregation (CA).

DETAILED DESCRIPTION OF THE EMBODIMENTS

Figure 1:
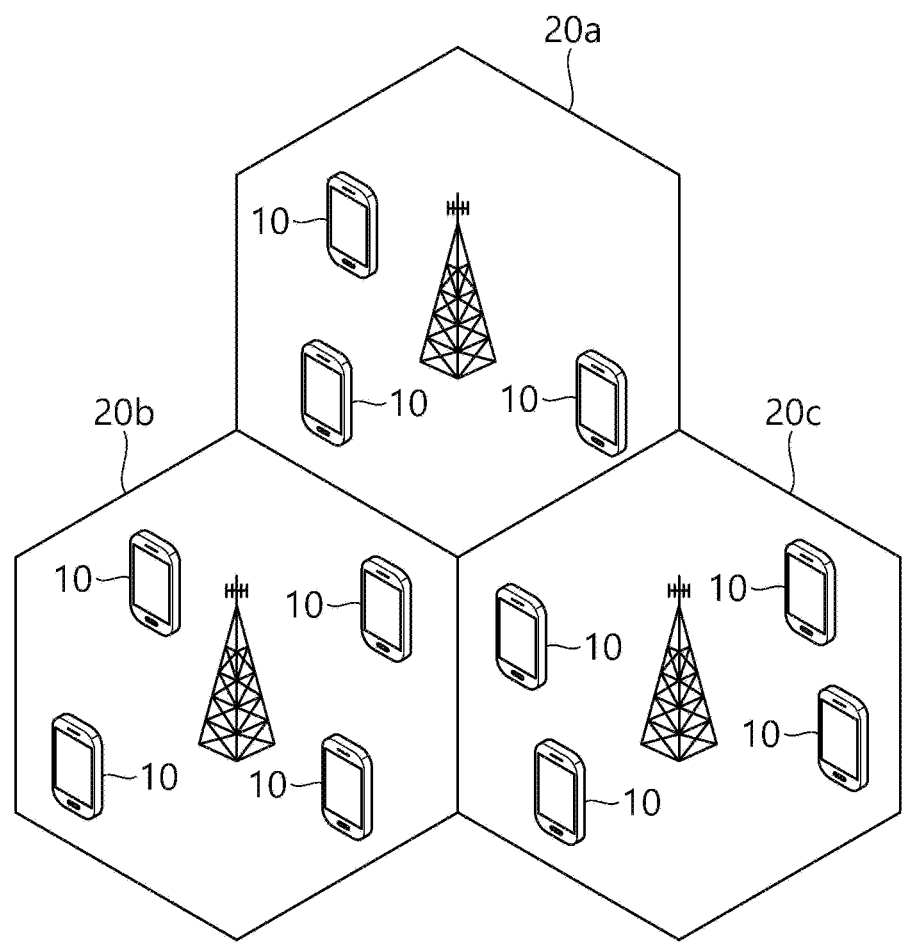
FIG. 1 illustrates a 3GPP LTE wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

Meanwhile, the LTE system defined by the 3GPP adopted such MIMO. Hereinafter, the LTE system is described in further detail.

Figure 2:
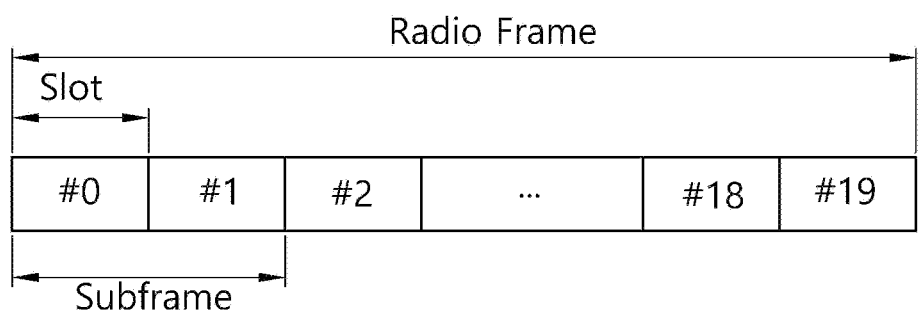
FIG. 2 illustrates the architecture of a radio frame according to FDD in 3GPP LTE.

FIG. 2 illustrates the architecture of a radio frame according to FDD in 3GPP LTE.

For the radio frame shown in FIG. 2, 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)", Ch. 5 may be referenced.

Referring to FIG. 2, the radio frame consists of 10 sub-frames, and each sub-frame includes two slots. The slots in the radio frame are numbered with slot numbers 0 to 19. The time taken for one sub-frame to be transmitted is denoted TTI (transmission time interval). The TTI may be a scheduling unit for data transmission. For example, the length of one radio frame is 10 ms, the length of one sub-frame is 1 ms, and the length of one slot may be 0.5 ms.

The architecture of radio frame is merely an example, and the number of sub-frames in the radio frame or the number of slots in each sub-frame may be changed variously.

Meanwhile, one slot may include a plurality of OFDM symbols. How many OFDM symbols are included in one slot may vary depending on cyclic prefix (CP).

Figure 3:
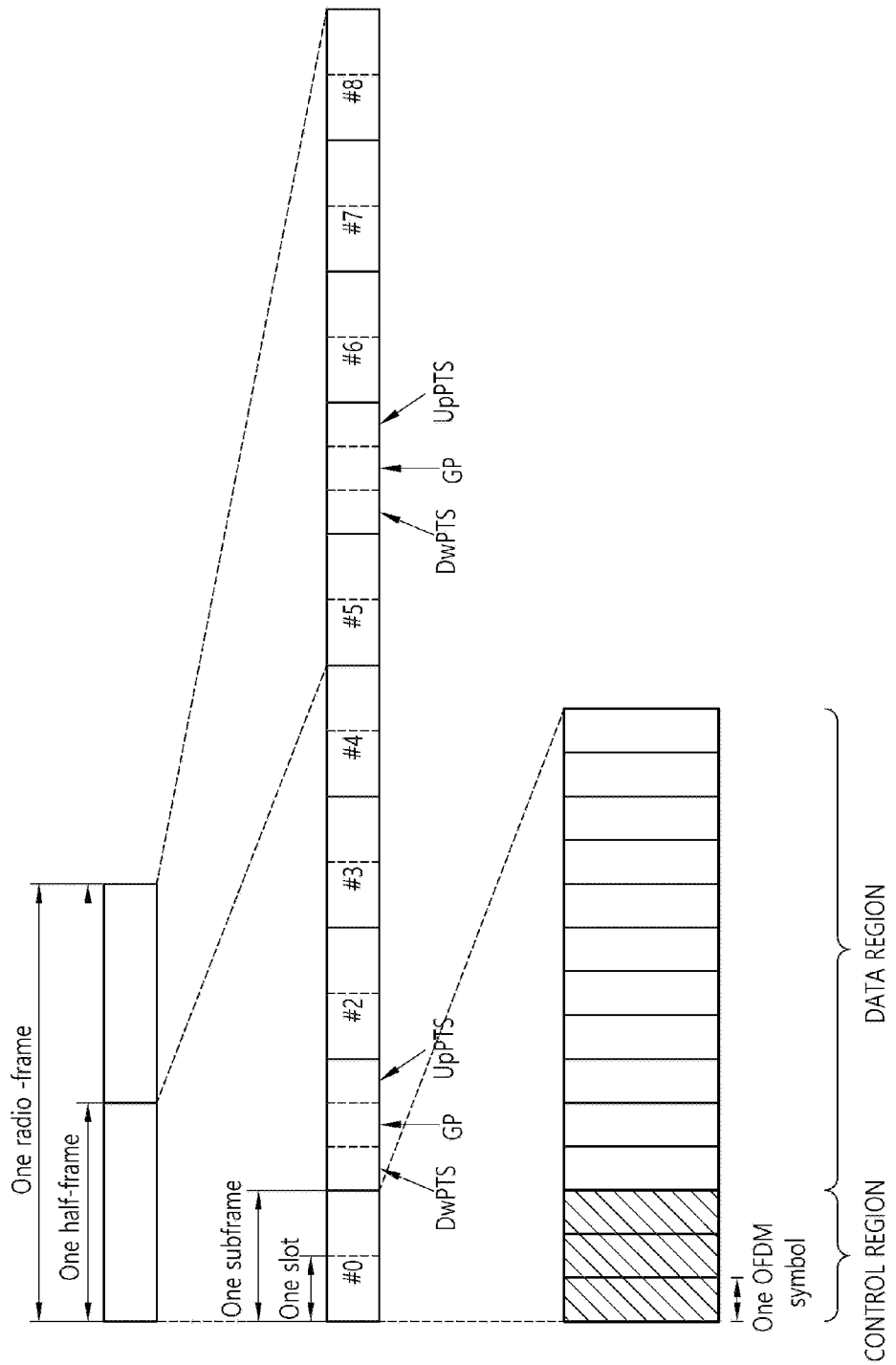
FIG. 3 illustrates the architecture of a downlink radio frame according to TDD in 3GPP LTE.

FIG. 3 illustrates the architecture of a downlink radio frame according to TDD in 3GPP LTE.

For this, 3GPP TS 36.211 V8.7.0 (2009-05) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Configuraiton | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame.

When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
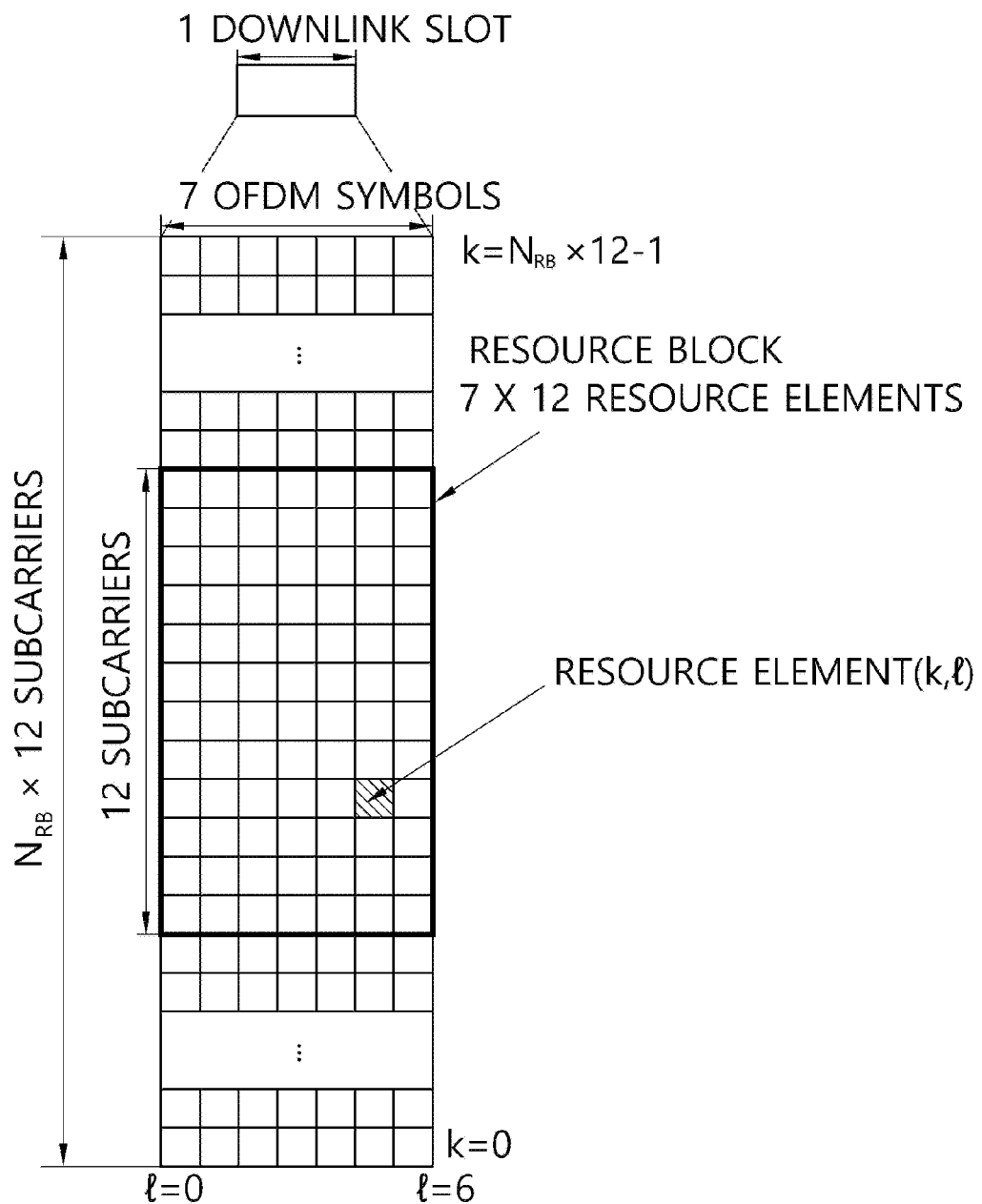
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
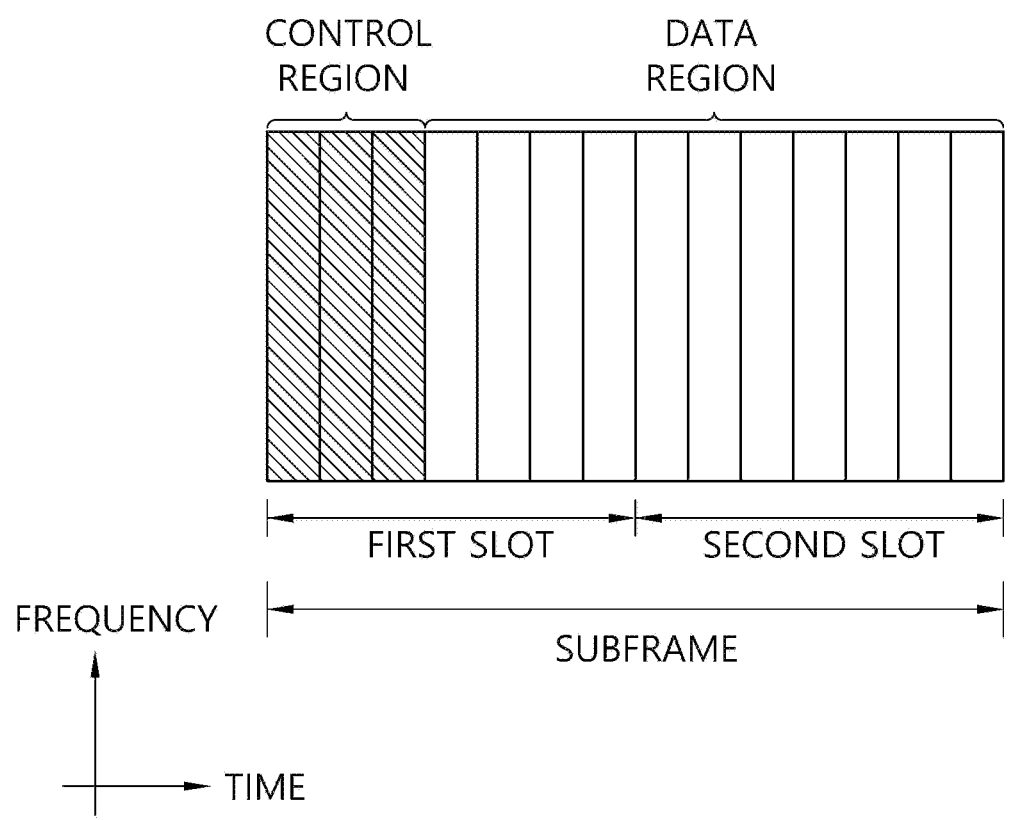
FIG. 5 illustrates the architecture of a downlink sub-frame.

FIG. 5 illustrates the architecture of a downlink sub-frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 6:
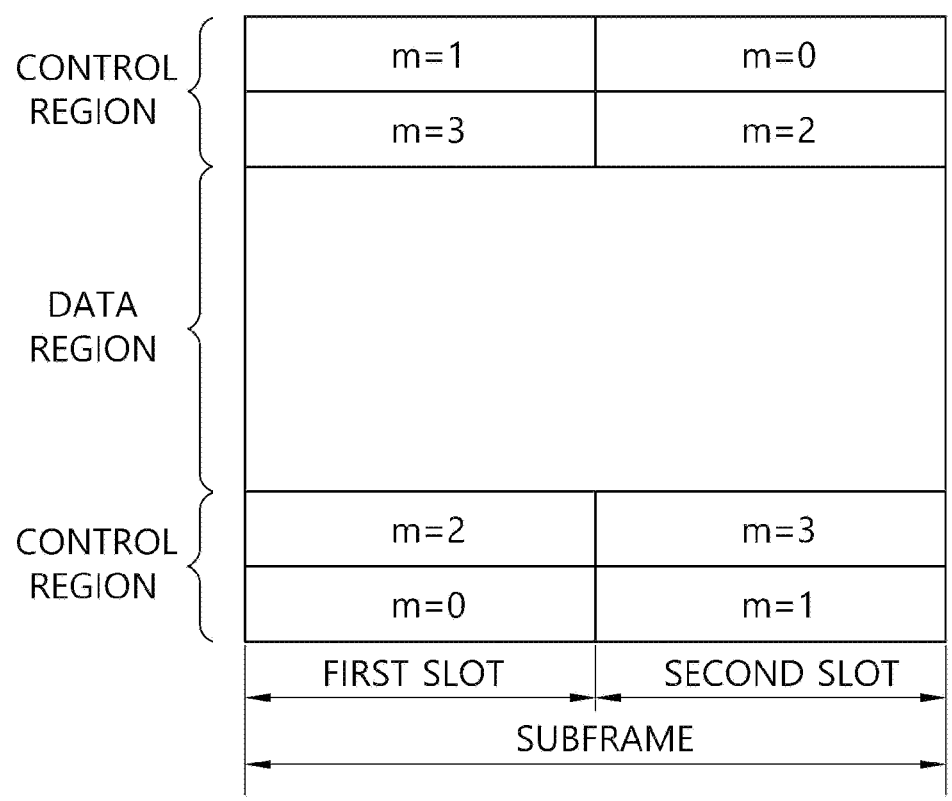
FIG. 6 illustrates the architecture of an uplink sub-frame in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

Meanwhile, an SC-FDMA transmission scheme is now described.

LTE (Long-Term Evolution) adopts, for uplink, SC (Single-Carrier) FDMA that is similar to OFDM (Orthogonal Frequency Division Multiplexing).

SC-FDMA may also be referred o as DFT-s OFDM (DFT-spread OFDM). In case the SC-FDMA transmission scheme is used, a non-linear distortion section of a power amplifier may be avoided, so that transmission power efficiency may be increased in a terminal with limited power consumption. Accordingly, user throughput may be increased.

SC-FDMA is similar to OFDM in that a signal is carried over split sub-carriers using FFT (Fast Fourier Transform) and IFFT (Inverse-FFT). However, an issue with the existing OFDM transmitter lies in that signals conveyed on respective sub-carriers on frequency axis are transformed into time-axis signals by IFFT. That is, in IFFT, the same operation is operated in parallel, resulting in an increase in PAPR (Peak to Average Power Ratio). In order to prevent such PAPR increase, SC-FDMA performs IFFT after DFT spreading unlike OFDM. That is, such transmission scheme that, after DFT spreading, IFFT is conducted is referred to as SC-FDMA. Accordingly, SC-FDMA is also referred to as DFT spread OFDM (DFT-s-OFDM) in the same meaning.

As such, advantages of SC-FDMA include providing robustness over a multi-path channel that comes from the fact that it has a similar structure to OFDM while fundamentally resolving the problem of OFDM that PAPR is increased by IFFT operation, thereby enabling effective use of a power amplifier.

Meanwhile, the 3GPP is devoting its energy to standardizing LTE-Advanced that is an evolutional version of LTE, and the clustered DFT-s-OFDM scheme has been adopted which permits non-contiguous resource allocation.

The clustered DFT-s OFDM transmission scheme is a variation of the existing SC-FDMA transmission scheme, and in this scheme, data symbols that have undergone a precoder are split into a plurality of sub-blocks that are mapped, separated from each other in the frequency domain.

Meanwhile, the LTE-A system is described in further detail.

A major feature of the clustered DFT-s-OFDM scheme is to enable frequency-selective resource allocation so as to flexibly deal with a frequency selective fading environment.

At this time, in the clustered DFT-s-OFDM scheme adopted as uplink access scheme in LTE-Advanced, unlike SC-FDMA that is a conventional LTE uplink access scheme, non-contiguous resource allocation is allowed, so that uplink data transmitted may be split into several cluster units.

That is, while the LTE system is configured to maintain the single carrier characteristic in the case of uplink, the LTE-A system permits DFT_precoded data to be assigned along the frequency axis in a non-contiguous way or both a PUSCH and a PUCCH to be transmitted at the same time. In such case, it is difficult to maintain the single carrier characteristic.

A carrier aggregation system is now described.

Figure 7:
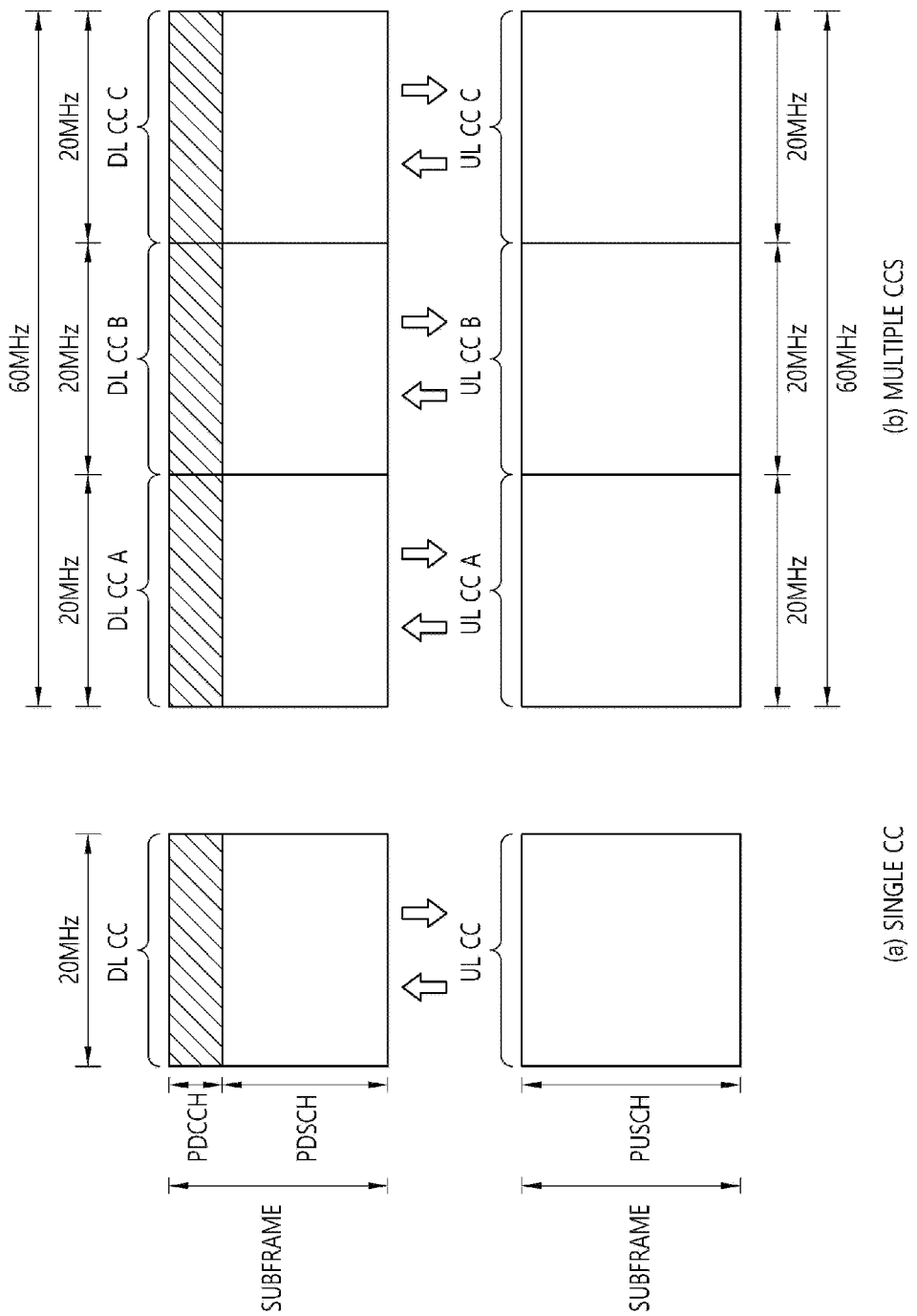
FIG. 7 illustrates an example of comparison between a single carrier system and a carrier aggregation system.

FIG. 7 illustrates an example of comparison between a single carrier system and a carrier aggregation system.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of a uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of (downlink component carrier, uplink component carrier). A plurality of serving cells may consist of a primary cell and one or more of all the secondary cells.

The PCC (primary component carrier) means a component carrier (CC) corresponding to the primary cell. The PCC is, among several CCs, the one where the terminal initially achieves connection or RRC connection with the base station. The PCC is a special CC that is in charge of connection or RRC connection for signaling regarding multiple CCs and manages terminal context information (UE context) that is connection information related with the terminal. Further, the PCC achieves connection with the terminal, so that the PCC is always left in the activation state when in RRC connected mode. The downlink component carrier corresponding to the primary cell is denoted downlink primary component carrier (DL PCC) and the uplink component carrier corresponding to the primary cell is denoted uplink primary component carrier (UL PCC).

The SCC (secondary component carrier) means a CC corresponding to a secondary cell. That is, the SCC is a CC other than the PCC, which is assigned to the terminal and is an extended carrier for the terminal to perform additional resource allocation in addition to the PCC. The SCC may be left in activation state or deactivation state. The downlink component carrier corresponding to the secondary cell is denoted downlink secondary component carrier (DL SCC) and the uplink component carrier corresponding to the secondary cell is denoted uplink secondary component carrier (UL SCC).

The primary cell and the secondary cell have the following characteristics.

First, the primary cell is used for transmitting a PUCCH. Second, the primary cell is always left activated while the secondary cell may be activated/deactivated depending on a specific condition. Third, when the primary cell experiences a radio link failure (hereinafter, 'RLF'), RRC re-connection is triggered. Fourth, the primary cell may be varied by a handover procedure that comes with an RACH (random access channel) procedure or by altering a security key. Fifth, NAS (non-access stratum) information is received through the primary cell. Sixth, in the FDD system, the primary cell has always a pair of a DL PCC and a UL PCC. Seventh, a different component carrier (CC) may be set as a primary cell in each terminal. Eighth, the primary cell may be replaced only through a handover or cell selection/cell re-selection procedure. In adding a new serving cell, RRC signaling may be used to transmit system information of a dedicated serving cell.

When configuring a serving cell, a downlink component carrier may form one serving cell or a downlink component carrier and an uplink component carrier form a connection to thereby configure one serving cell. However, a serving cell is not configured with one uplink component carrier alone.

Activation/deactivation of a component carrier is equivalent in concept to activation/deactivation of a serving cell. For example, assuming that serving cell 1 is constituted of DL CC1, activation of serving cell 1 means activation of DL CC1. If serving cell2 is configured by connection of DL CC2 and UL CC2, activation of serving cell2 means activation of DL CC2 and UL CC2. In this sense, each component carrier may correspond to a serving cell.

The number of component carriers aggregated between uplink and downlink may vary. When the number of downlink CCs is the same as the number of uplink CCs is denoted symmetric aggregation, and when the numbers differ from each other is denoted asymmetric aggregation. Further, the sizes (i.e., bandwidth) of CCs may be different from each other. For example, when five CCs are used to configure a 70 MHz band, the configuration may be made as follows: 5 MHz CC (carrier #0)+20 MHz CC (carrier #1)+20 MHz CC (carrier #2)+20 MHz CC (carrier #3)+5 MHz CC (carrier #4).

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 8:
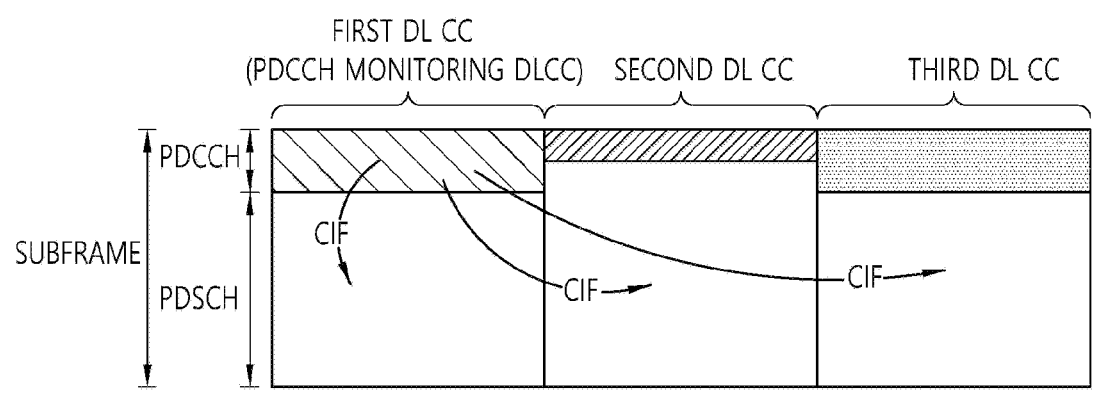
FIG. 8 illustrates an example of cross-carrier scheduling in a carrier aggregation system.

FIG. 8 illustrates an example of cross-carrier scheduling in a carrier aggregation system.

Referring to FIG. 8, the base station may configure a PDCCH monitoring DL CC (monitoring CC) set. The PDCCH monitoring DL CC set consists of some of all the aggregated DL CCs. If cross-carrier scheduling is configured, the terminal conducts PDCCH monitoring/decoding only on the DL CCs included in the PDCCH monitoring DL CC set. In other words, the base station transmits a PDCCH for PDSCH/PUSCH to be scheduled only through the DL CCs included in the PDCCH monitoring DL CC set. The PDCCH monitoring DL CC set may be configured terminal-specifically, terminal group-specifically, or cell-specifically.

In FIG. 8, three DL CCs (DL CC A, DL CC B, and DL CC C) are aggregated, and by way of example, DL CC A is set as the PDCCH monitoring DL CC set. The terminal may receive a DL grant for the PDSCH of DL CC A, DL CC B, and DL CC C through the PDCCH of DL CC A. The DCI transmitted through the PDCCH of DL CC A includes a CIF which allows it to be known which DL CC the DCI is for.

The CIF value is the same as the serving cell index value. The serving cell index is transmitted to the UE through an RRC signal. The serving cell index includes a value for identifying a serving cell, i.e., a first cell (primary cell) or a second cell (secondary cell). For example, 0 may represent a first cell (primary cell).

Figure 9:
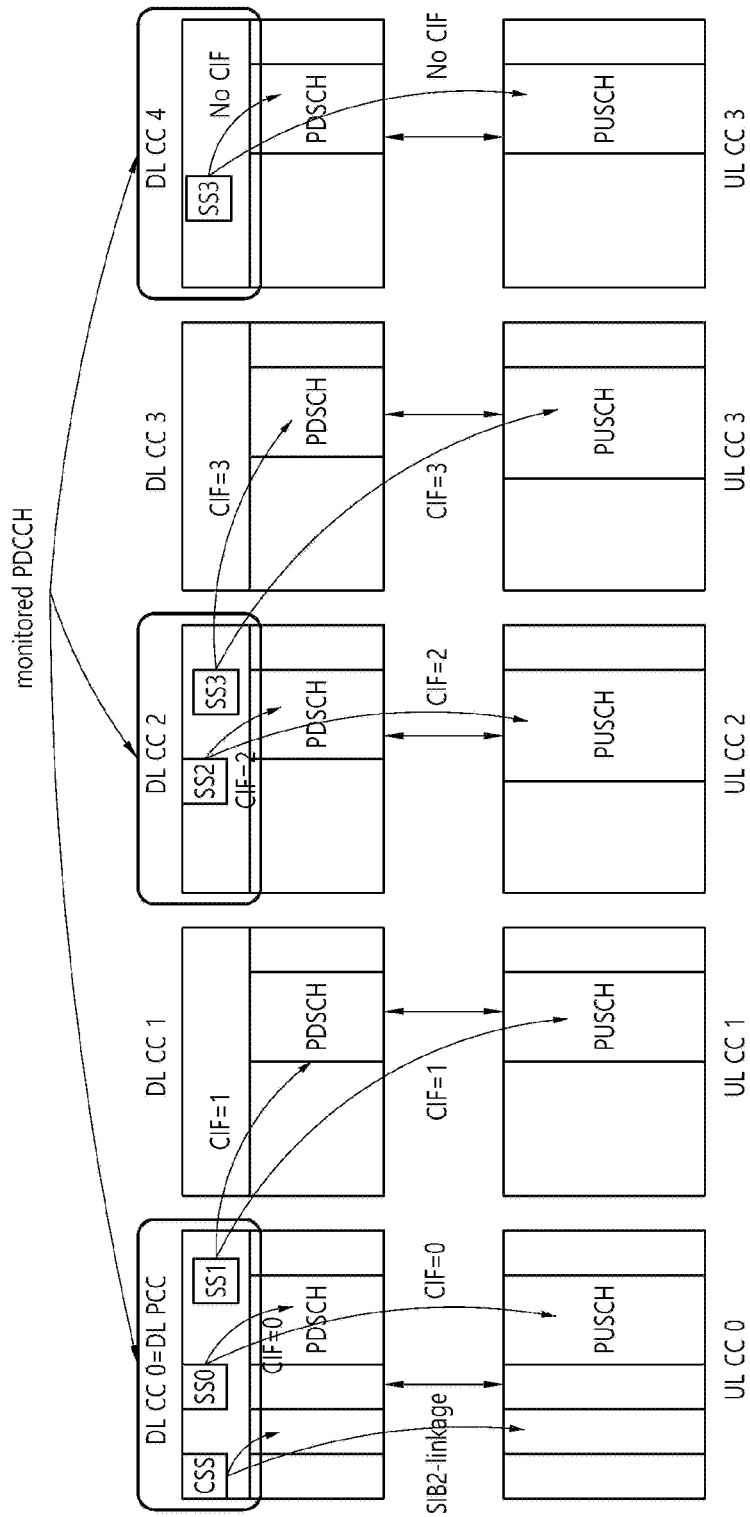
FIG. 9 illustrates example scheduling when cross-carrier scheduling is configured in a carrier aggregation system.

FIG. 9 illustrates example scheduling when cross-carrier scheduling is configured in a carrier aggregation system.

Referring to FIG. 9, DL CC 0, DL CC 2, and DL CC 4 are a PDCCH monitoring DL CC set. The terminal searches a DL grant/UL grant for DL CC 0, UL CC 0 (UL CC linked via SIB2 with DL CC 0) in the CSS of DL CC 0. In SS 1 of DL CC 0, a DL grant/UL grant for DL CC 1, UL CC 1 is searched. SS 1 is an example of the USS. That is, SS 1 of DL CC 0 is a search space for searching a DL grant/UL grant performing cross-carrier scheduling.

Meanwhile, the carrier aggregation (CA) technologies, as described above, may be generally separated into an inter-band CA technology and an intra-band CA technology. The inter-band CA is a method that aggregates and uses CCs that are present in different bands from each other, and the intra-band CA is a method that aggregates and uses CCs in the same frequency band. Further, CA technologies are more specifically split into intra-band contiguous CA, intra-band non-contiguous CA, and inter-band non-contiguous CA.

FIG. 10 is a concept view illustrating intra-band carrier aggregation (CA).

FIG. 10(*a*) illustrates intra-band contiguous CA, and FIG. 10(*b*) illustrates intra-band non-contiguous CA.

LTE-advanced adds various schemes including uplink MIMO and carrier aggregation in order to realize high-speed wireless transmission. The CA that is being discussed in LTE-advanced may be split into the intra-band contiguous CA shown in FIG. 10(*a*) and the intra-band non-contiguous CA shown in FIG. 10(*b*).

Figure 11:
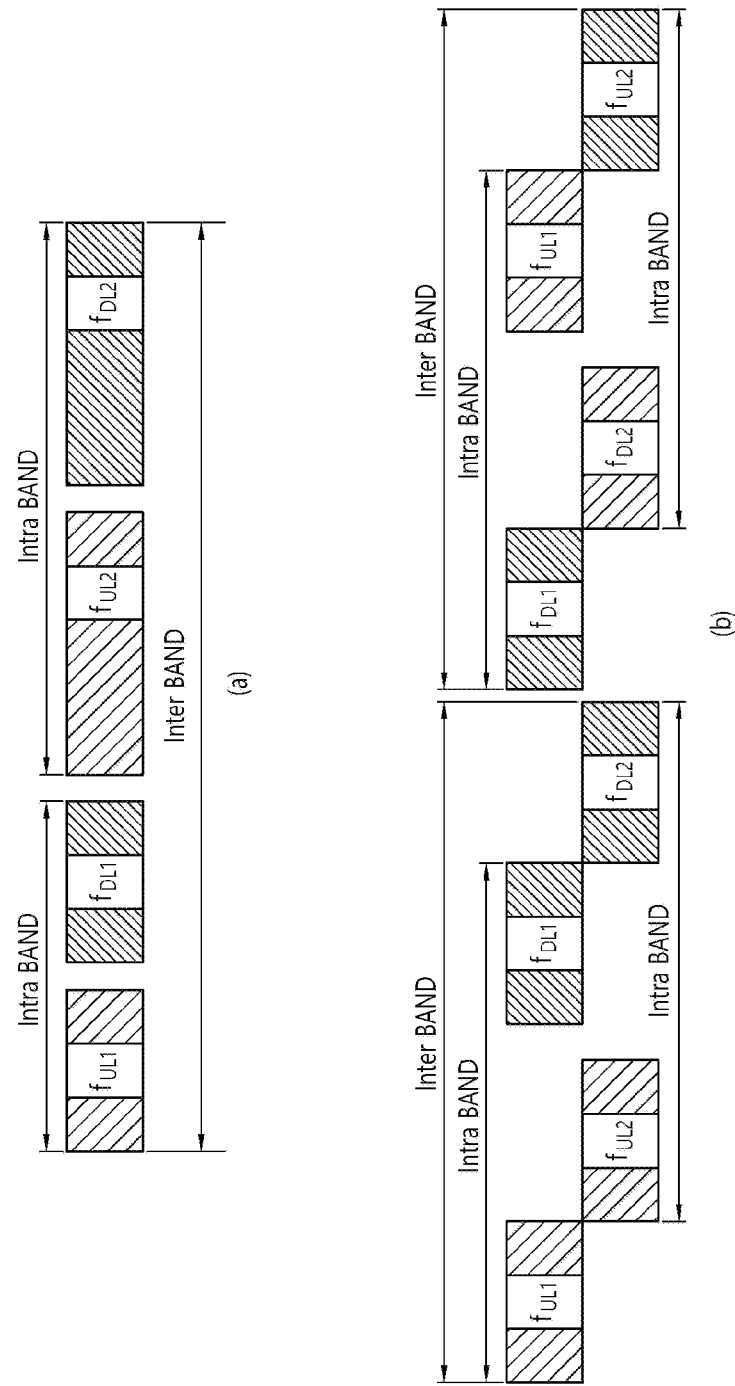
FIG. 11 is a concept view illustrating inter-band carrier aggregation.

FIG. 11 is a concept view illustrating inter-band carrier aggregation.

FIG. 11(*a*) illustrates a combination of a lower band and a higher band for inter-band CA, and FIG. 11(*b*) illustrates a combination of similar frequency bands for inter-band CA.

In other words, the inter-band carrier aggregation may be separated into inter-band CA between carriers of a low band and a high band having different RF characteristics of inter-band CA as shown in FIG. 11(*a*) and inter-band CA of similar frequencies that may use a common RF terminal per component carrier due to similar RF (radio frequency) characteristics as shown in FIG. 11(*b*).

TABLE 2

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |

TABLE 2-continued

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A N/A | 1452 MHz-1496 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

Meanwhile, the 3GPP LTE/LTE-A systems define operating bands for uplink and downlink as shown in Table 2 above. Four CA cases shown in FIG. 11 come from Table 2.

Here, $F_{UL\_low}$ means the lowest frequency in the uplink operating bands. $F_{UL\_high}$ means the highest frequency in the uplink operating bands. Further, $F_{DL\_low}$ means the lowest frequency in the downlink operating bands, and $F_{DL\_high}$ means the highest frequency in the downlink operating bands.

When the operating bands are defined as shown in Table 2, each nation's frequency distributing organization may assign specific frequencies to service providers in compliance with the nation's circumstances.

Meanwhile, intra-band contiguous CA bandwidth classes and their corresponding guard bands are as shown in the following table.

TABLE 3

| CA Bandwidth Class | Aggregated Transmission Bandwidth Configuration | Maximum number of CCs | Nominal Guard Band BWGB |
|---|---|---|---|
| A | $N_{RB,\ agg} \leq 100$ | 1 | a1BW$_{Channel(1)}$ - 0.5Δf1 (NOTE2) |

TABLE 3-continued

| CA Bandwidth Class | Aggregated Transmission Bandwidth Configuration | Maximum number of CCs | Nominal Guard Band BWGB |
|---|---|---|---|
| B | $N_{RB,\ agg} \leq 100$ | 2 | $0.05\ max(BW_{Channel(1)}, BW_{Channel(2)}) - 0.5\Delta fl$ |
| C | $100 < N_{RB,\ agg} \leq 200$ | 2 | $0.05\ max(BW_{Channel(1)}, BW_{Channel(2)}) - 0.5\Delta fl$ |
| D | $200 < N_{RB,\ agg} \leq [300]$ | FFS | $0.05\ max(BW_{Channel(1)}, BW_{Channel(2)}) - 0.5\Delta fl$ |
| E | $[300] < N_{RB,\ agg} \leq [400]$ | FFS | FFS |
| F | $[400] < N_{RB,\ agg} \leq [500]$ | FFS | FFS |

NOTE1:
$BW_{Channel(i),\ j} = 1, 2, 3$ is the channel bandwidth of the E-UTRA component carriers defined in TS36.101 table 5.6-1, $\Delta fl$ represents subcarrier spacing of $\Delta f$ when downlink, and $\Delta fl = 0$ in downlink.
(NOTE2):
In case that the channel frequency bandwidth is 1.4 MHz, a1 = 0.16/1.4, and in the remainder frequency band, a1 = 0.05.

In the above table, the brackets [ ] represent that the value therebetween is not completely determined and may be varied. FFS stands for 'For Further Study.' $N_{RB\_agg}$ is the number of RBs aggregated in an aggregation channel band.

Table 4 below shows bandwidth sets respective corresponding to intra-band contiguous CA configurations.

TABLE 4

E-UTRA CA configuration/Bandwidth combination set

| E-UTRA CA configuration | Channel frequency bandwidth permitted by each carrier | Channel frequency bandwidth permitted by each carrier | Channel frequency bandwidth permitted by each carrier | Maximum aggregated bandwidth [MHz] | Bandwidth Combination Set |
|---|---|---|---|---|---|
| CA_1C | 15 20 | 15 20 | | 40 | 0 |
| CA_3C | 5, 10, 15 20 | 20 5, 10, 15, 20 | | 40 | 0 |
| CA_7C | 15 20 10 15 20 | 15 20 20 15, 20 10, 15, 20 | | 40 40 | 0 1 |
| CA_23B | 10 5 | 10 15 | | 20 | 0 |
| CA_27B | 1.4, 3, 5 1.4, 3 | 5 10 | | 13 | 0 |
| CA_38C | 15 20 | 15 20 | | 40 | 0 |
| CA_39C | 5, 10, 15 20 | 20 5, 10, 15 | | 35 | 0 |
| CA_40C | 10 15 20 | 20 15 10, 20 | | 40 | 0 |
| CA_41C | 10 15 20 5, 10 15 20 | 20 15, 20 10, 15, 20 20 15, 20 5, 10, 15, 20 | | 40 40 | 0 1 |
| CA_40D | 10, 20 20 20 | 20 10 20 | 20 20 10 | 60 | 0 |
| CA_41D | 10 10 15 15 20 20 | 20 15, 20 20 10, 15, 20 15, 20 10, 15, 20 | 15 20 10, 15 20 10 15, 20 | 60 | 0 |
| CA_42C | 5, 10, 15, 20 20 | 20 5, 10, 15 | | 40 | 0 |

In the above table, CA configuration represents an operating bandwidth and CA bandwidth class. For example, CA_1C means operating band 2 in Table 2 and CA band class C in Table 3. All of the CA operating classes may apply to bands that are not shown in the above table. In addition, class D is added in Rel-12 as represented in the above table, through this, maximum 3 carriers can be transmitted from the intra-band continuous CA at the same time.

Figure 12:
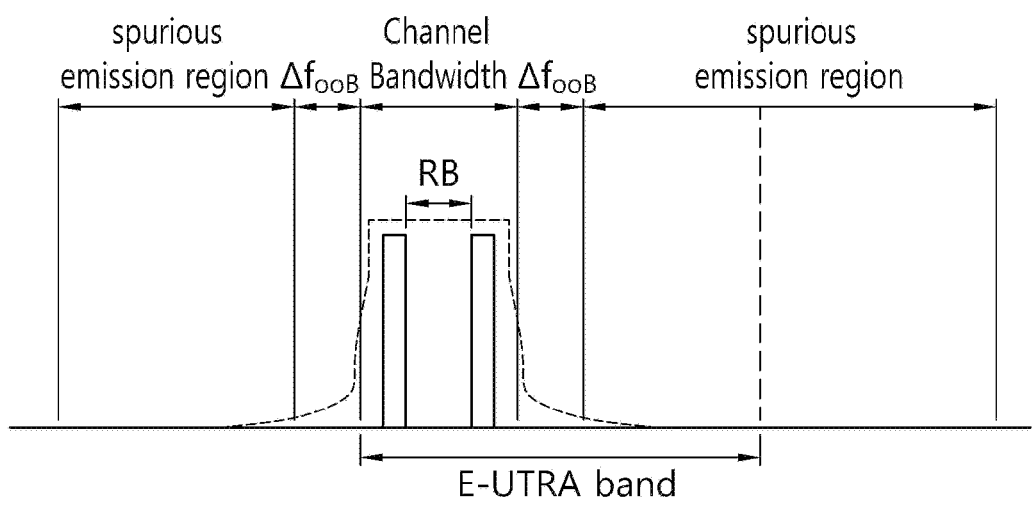
FIG. 12 illustrates the concept of unwanted emission.
Figure 13:
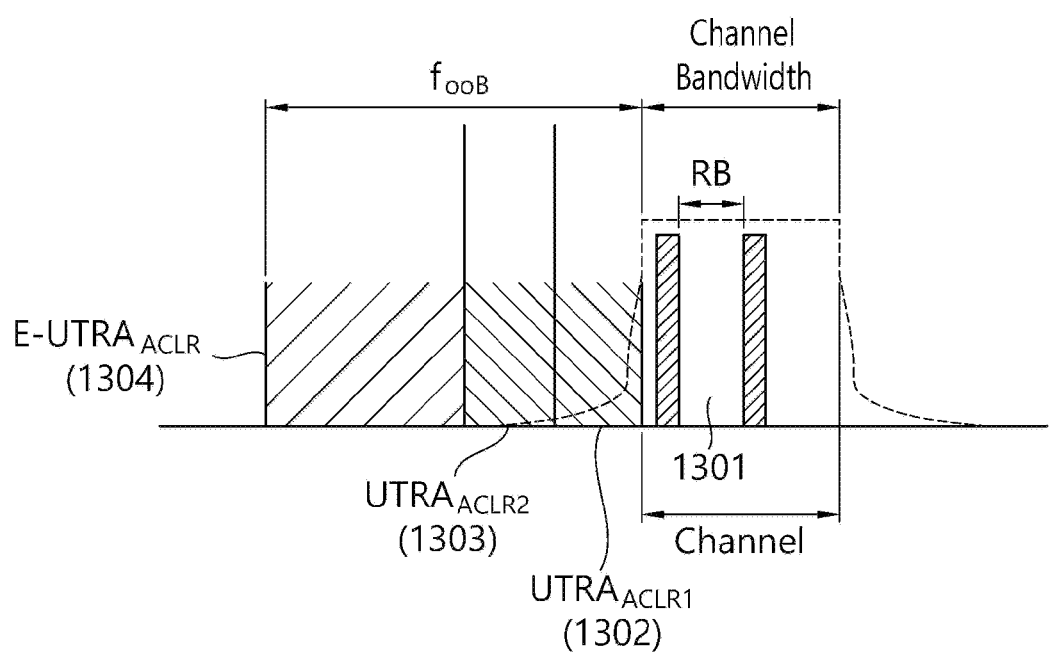
FIG. 13 specifically illustrates out-of-band emission of the unwanted emission shown in FIG. 12.
Figure 14:
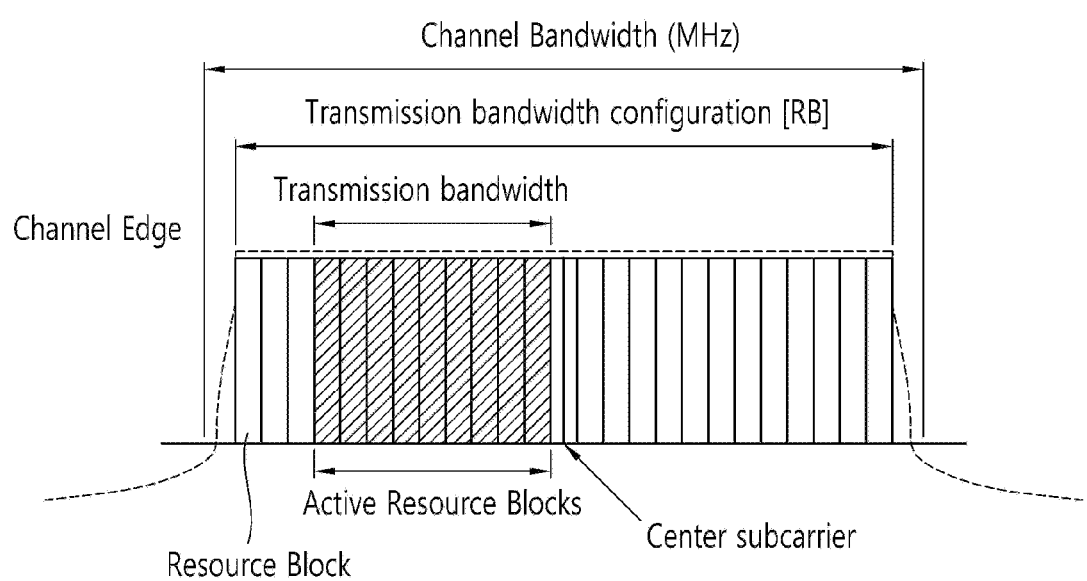
FIG. 14 illustrates a relationship between the resource block RB and channel band (MHz) shown in FIG. 12.

FIG. 12 illustrates the concept of unwanted emission. FIG. 13 specifically illustrates out-of-band emission of the unwanted emission shown in FIG. 12. FIG. 14 illustrates a relationship between the resource block RB and channel band (MHz) shown in FIG. 12.

As can be seen from FIG. 12, a transmission modem sends a signal over a channel bandwidth assigned in an E-UTRA band.

Here, the channel bandwidth is defined as can be seen from FIG. 14. That is, a transmission bandwidth is set to be smaller than the channel bandwidth ($BW_{Channel}$). The transmission bandwidth is set by a plurality of resource blocks (RBs). The outer edges of the channel are the highest and lowest frequencies that are separated by the channel bandwidth.

Meanwhile, as described above, the 3GPP LTE system supports channel bandwidths of 1.4 MHz, 3 MHz, 5 MHz, 10 MHz, 15 MHz, and 20 MHz. The relationship between such channel bandwidths and the number of resource blocks is as below.

TABLE 5

| | Channel bandwidth $BW_{Channel}$ [MHz] | | | | | |
|---|---|---|---|---|---|---|
| | 1.4 | 3 | 5 | 10 | 15 | 20 |
| Transmission bandwidth settings NRB | 6 | 15 | 25 | 50 | 75 | 100 |

Turning back to FIG. 12, unwanted emission arises in the band of $\Delta f_{OOB}$, and as shown, unwanted emission also occurs on the spurious area. Here, $\Delta f_{OOB}$ means the magnitude in the out-of-band (OOB). Meanwhile, the out-of-band omission refers to the one that arises in a band close to an intended transmission band. The spurious emission means that unwanted waves spread up to a frequency band that is far away from the intended transmission band.

Meanwhile, 3GPP release 10 defines basic SE (spurious emission) that should not be exceeded according to a frequency range.

In the meantime, as illustrated in FIG. 13, if transmission is conducted in the E-UTRA channel band 1301, leakage, i.e., unwanted emission, occurs to out-of-bands (1302, 1303, and 1304 in the shown $f_{OOB}$ area).

Here, UTRAACLR1 denotes a ratio of leakage to a channel 1302 to an E-UTRA channel 1301, i.e., an adjacent channel leakage ratio, in case the adjacent channel 1302 is the one for UTRA when a terminal conducts transmission on the E-UTRA channel 1301. UTRAACLR2 is a ratio of leakage to a channel 1303 (a UTRA channel) located to the adjacent channel 1302, i.e., an adjacent channel leakage ratio, in case the channel 1303 is the one for UTRA, as shown in FIG. 13. E-UTRAACLR is a ratio of leakage to an adjacent channel 1304 (i.e., an E-UTRA channel) when the terminal conducts transmission through the E-UTRA channel 1301, i.e., an adjacent channel leakage ratio.

As set forth above, if transmission is conducted in an assigned channel band, unwanted emission occurs to adjacent channels.

As described above, unwanted emission arises to bands adjacent to each other. At this time, with respect to interference caused by transmission from the base station, the amount of interference to adjacent bands may be reduced to an allowed reference or less by designing a high-price and bulky RF filter in view of the base station's nature. On the contrary, in the case of the terminal, it is difficult to completely prevent interference to adjacent bands due to, e.g., the limited size of terminal and limited price of the power amplifier or pre-duplex filter RF device.

Accordingly, the terminal's transmission power needs to be limited.

In the LTE system, a maximum power Pcmax in the UE is simply expressed as follows.

$$P\text{cmax}=\text{Min}(P\text{emax},Pu\text{max})\quad\quad\quad\text{[Equation 1]}$$

Where, the Pcmax represents maximum power (actual maximum transmission power) where the UE may transmit in a corresponding cell, and the Pemax represents usable maximum power in a corresponding cell to which the BS signals. Further, the Pumax represents maximum power of the UE on which Maximum Power Reduction (hereinafter referred to as "MPR") and Additive-MPR (hereinafter referred to as "A-MPR") are considered.

The maximum power $P_{PowerClass}$ of the UE is listed in a following table 6.

TABLE 6

| Operating band | Power class 1 (dBm) | Power class 3 (dBm) |
|---|---|---|
| 1, 2, 3, 4, 5, 6, 7, 8, 9, 10, 11, 12, 13, 14, 17, 18, 18, 19, 20, 21, 22, 23, 24, 25, 26, 27, 28, 30, 31, 33, 34, 35, 36, 37, 38, 39, 40, 41, 42, 43, 44 | | 23 dBm |
| 14 | 31 dBm | |

Meanwhile, in a case of intra-band continuous CA. maximum power $P_{PowerClass}$ as of the UE is listed in a following table 7.

TABLE 7

| Operating Band | Power class 3 (dBm) |
|---|---|
| CA_1C | 23 dBm |
| CA_3C | 23 dBm |
| CA_7C | 23 dBm |
| CA_38C | 23 dBm |
| CA_39C | 23 dBm |
| CA_40C | 23 dBm |
| CA_41C | 23 dBm |
| CA_42C | 23 dBm |

Figure 15:
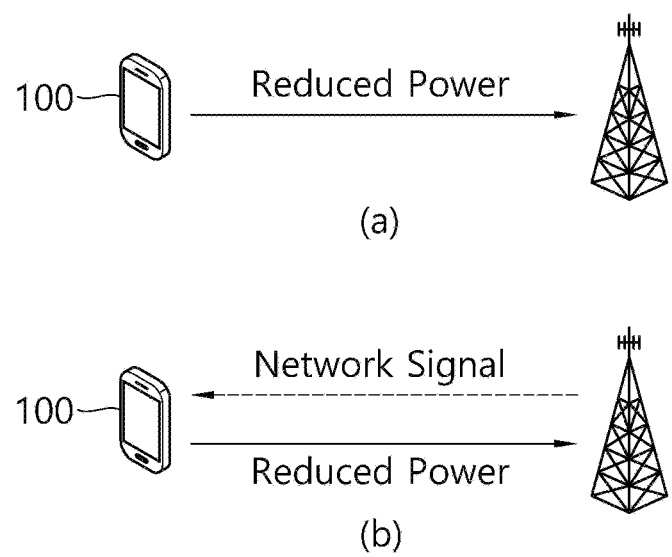
FIG. 15 illustrates an example of a method of limiting transmission power of a terminal.

FIG. 15 illustrates an example of a method of limiting transmission power of a terminal.

As can be seen from FIG. 15(*a*), the terminal 100 conducts transmission with transmission power limited In case a PAPR (peak-to-average power ratio) is increased, linearity of the power amplifier (PA) is reduced, as an MPR (maximum power reduction) value for limiting transmission power, an MPR value up to 2 dB may apply depending on modulation schemes in order to maintain such linearity.

<MPR According to 3GPP Release 11>

Meanwhile, according to 3GPP release 11, the terminal adopts multi-cluster transmission in a single CC (component carrier) and may simultaneously transmit a PUSCH and a PUCCH. As such, if the PUSCH and the PUCCH are transmitted at the same time, the size of the IM3 component (which means a distortion signal generated by intermodulation) that occurs at an out-of-band area may be increased as compared with the existing size, and this may serve as larger interference to an adjacent band. Thus, the following MPR value may be set so as to meet general spurious emission, ACLR (adjacent channel leakage ratio) and general SEM (spectrum emission mask) that are the terminal's emission requirements that should be observed by the terminal upon uplink transmission.

<A-Mpr>

As can be seen from FIG. 15(*b*), the base station may apply A-MPR (additional maximum power reduction) by transmitting a network signal (NS) to the terminal 100. The A-MPR, unlike the above-mentioned MPR, is that the base station transmits the network signal (NS) to the terminal 100 operating at a specific operating band so that the terminal 100 conducts additional power reduction in order not to affect adjacent bands, for example, not to give interference to the adjacent bands. That is, if a terminal applied with MPR receives a network signal (NS), A-MPR is additionally applied to determine transmission power.

The following table represents A-MPR values per network signal.

TABLE 8

| Network Signaling value | Channel bandwidth (MHz) | Resources Blocks (NRB) | A-MPR (dB) |
|---|---|---|---|
| NS_01 | 1.4, 3, 5, 10, 15, 20 | | Not defined |
| NS_03 | 3 | >5 | ≤1 |
| | 5 | >6 | ≤1 |
| | 10 | >6 | ≤1 |
| | 15 | >8 | ≤1 |
| | 20 | >10 | ≤1 |
| NS_04 | 5 | >6 | ≤1 |
| NS_05 | 10, 15, 20 | ≥50 | ≤1 |
| NS_06 | 1.4, 3, 5, 10 | — | Not defined |
| NS_07 | 10 | | Shown in Table 9 |
| NS_08 | 10, 15 | >44 | ≤3 |
| NS_09 | 10, 15 | >40 | ≤1 |
| | | >55 | ≤2 |
| NS_18 | 5 | ≥2 | ≤1 |
| | 10, 15, 20 | ≥1 | ≤4 |

The following table represents A-MPR values when the network signal is NS_07.

TABLE 9

| RB$_{start}$ | Parameter | | | | |
|---|---|---|---|---|---|
| | Region A 0-12 | | Region B 13-18 | 19-42 | Region C 43-49 |
| L$_{CRB}$ [RBs] | 6-8 | 1-5, 9-50 | ≥8 | ≥18 | ≤2 |
| A-MPR [dB] | ≤8 | ≤12 | ≤12 | ≤6 | ≤3 |

In the above table, RB$_{start}$ indicates the lowest RB index of a transmission RB. LCRB indicates the length of consecutive RB allocations.

For example, in case the terminal provided with a service using a 10 MHz channel bandwidth receives NS_07 as a network signal, the terminal determines transmission power according to the above table and transmits the determined transmission power. In other words, in case the terminal instructs 5 RBs to be continuously sent from the 10th RB that is a start point of the RBs when decoding a received uplink grant, the terminal may send the A-MPR value with up to 12 dB applied.

<A-MPR According to CA>

On the other hands, taking CA into consideration, the channel bandwidth of uplink may be increased up to 40 MHz (20 MHz+20 MHz), and accordingly, a larger MPR value is needed. Thus, in case the base station transmits a network signal to the terminal to protect a specific band in the CA environment, additional power reduction is conducted in the terminal operating at the specific band, thereby protecting adjacent bands.

<Disclosures of the Present Specification>

Figure 16A:
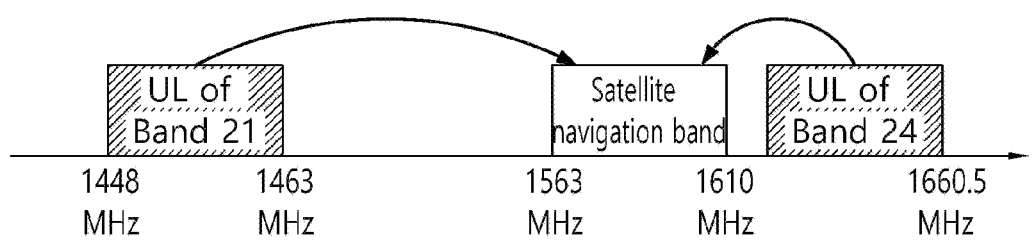
FIG. 16A to FIG. 16C illustrate an example of a transmission on a UL band for the conventional LTE/LTE-A that interferes in the satellite navigation band and the industrial scientific medical (ISM) band.
Figure 16B:
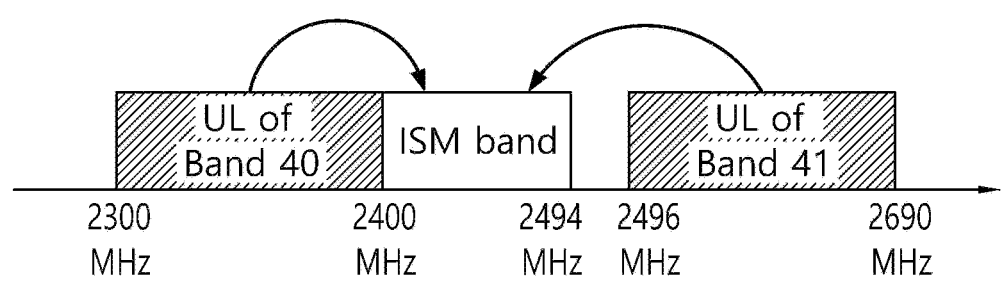
Figure 16C:
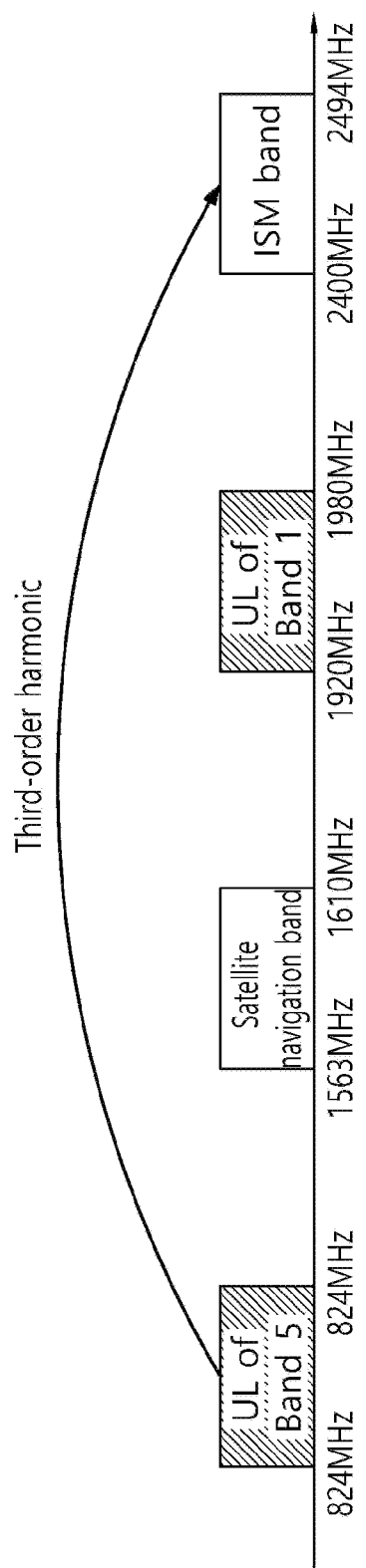
Figure 16D:
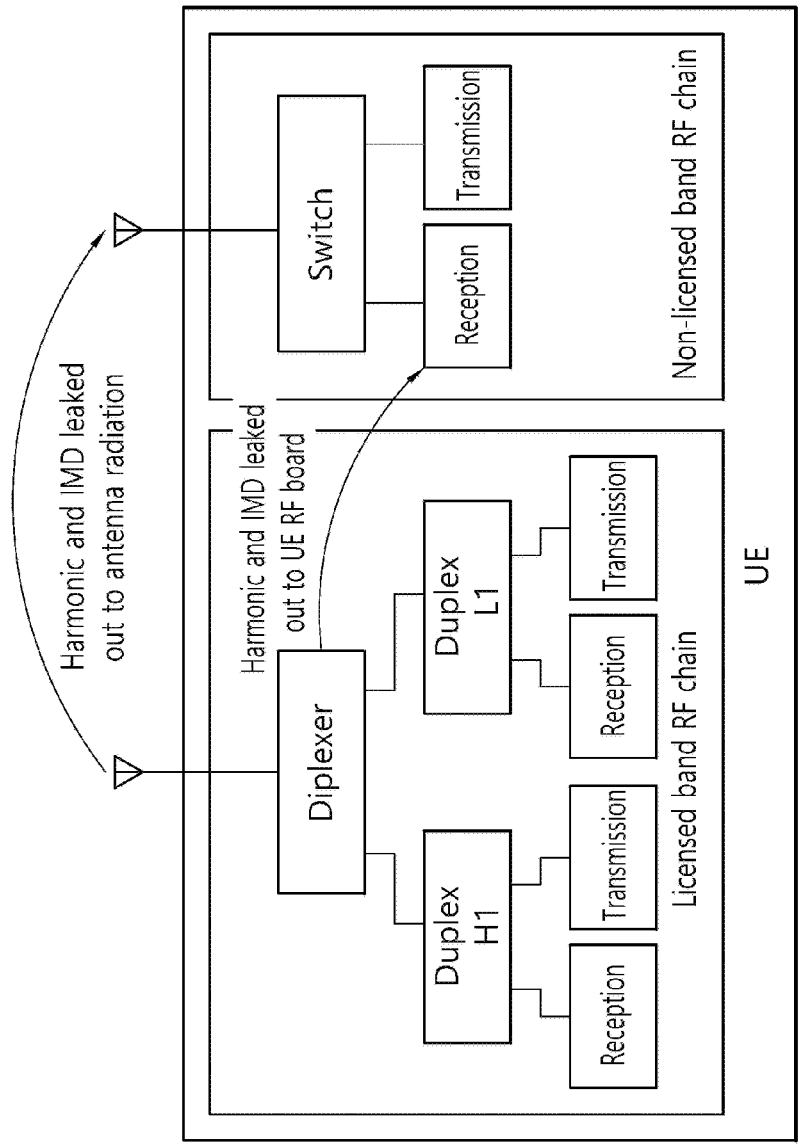
FIG. 16D illustrates an example of the harmonic and the IMD by a transmission on a UL band for the conventional LTE/LTE-A in a UE that interferes in the satellite navigation band and the industrial scientific medical (ISM) band owing to an antenna radiation or a leakage power on a RF board in a UE.

FIG. 16A to FIG. 16C illustrate an example of a transmission on a UL band for the conventional LTE/LTE-A that interferes in the satellite navigation band and the industrial scientific medical (ISM) band. FIG. 16D illustrates an example of the harmonic and the IMD by a transmission on a UL band for the conventional LTE/LTE-A in a UE that interferes in the satellite navigation band and the industrial scientific medical (ISM) band owing to an antenna radiation or a leakage power on a RF board in a UE.

Referring FIG. 16A, a band for the UL of band 21 and the UL of band 24 shown in Table 2 and a band for the satellite navigation, for example, the global positioning system (GPS) and the global navigation satellite system (GNSS, Galileo; or also referred to GLONASS) are depicted on a frequency axis. At the moment, in case that a UE performs a transmission on the UL on band 21 or band 24, the transmission may interfere in the band for satellite navigation.

In addition, referring to FIG. 16B, the UL of band 40 and the UL of band 41 shown in Table 2 and the ISM band (e.g., used for Wi-Fi) are depicted on a frequency axis. At the moment, in case that a UE performs a transmission on the UL on band 40 or band 41, the transmission may interfere in the ISM band.

Furthermore, referring to FIG. 16C, the UL of band 5 and the UL of band 1 shown in Table 2, the satellite navigation band and the non-licensed industry, science and medical (ISM) band are depicted on a frequency axis. Although the non-licensed ISM band corresponds to 2400 MHz to 2494 MHz and 5150 MHz to 5925 MHz, only one of them is shown in FIG. 16C. At the moment, in case that a UE performs a transmission on the UL on band 5, the transmission may interfere in the ISM band owing to a third-order harmonic component.

In addition, FIG. 16D illustrates influences on an interference exerted in a receiving unit of the non-licensed band by the harmonic and the IMD generated from the LTE/LTE-A carrier aggregation in a UE and entered into a transceiver antenna of the non-licensed band through an antenna, and influences on an interference exerted in the receiving unit of the non-licensed band by a power leaked out via an RF board within a UE before going through the antenna.

Of course, a performance degradation of a UE which is performing transmission on the non-licensed band located geographically neighboring position may be considered, which is owing to the influences of the harmonic and the IMD generated from a UL frequency carrier aggregation UE occurred by interferences between UEs in addition to the interferences within one UE.

Here, the harmonic is also called a hither harmonic wave, and referred to a multiple frequency component of a fundamental frequency through which a transmission is performed. For example, the harmonic frequency of 824 MHz becomes 1648 MHz, 2472 MHz, and the like. Such a harmonic is generated by a non-linear power amplifier (PA) within a UE, or a duplexer, a diplexer, or the like, which is a passive element.

In addition, although it is not shown, in case that a UE performs a transmission on the UL of band 1, the transmission interferes the ISM band, that is, 5150 MHz to 5925 MHz by the third-order harmonic component.

The interferences in the situations of FIG. 16A and FIG. 16B described above have been already removed through many researches. However, researches have not been progressed up to now for the interferences owing to the harmonic component as shown in FIG. 6c. Particularly, researches have not been progressed for the interferences exerted in the ISM band used for Wi-Fi (or WLAN) and the satellite navigation band owing to the harmonic component.

In order to minimize the influences on interferences owing to the harmonic component, simply, it may be implemented that a UE based on LTE/LTE-A and a device operated on the ISM band are to transmit and to receive in different times each other by the time division multiplexing (TDM) scheme. For this, a network may transmit signals to each of the UE based on LTE/LTE-A and the device operated on the ISM band. As another simple method, the problem may be solved by transmitting signals for the UE based on LTE/LTE-A on a frequency band that is significantly far from the ISM band. However, such a method is to protect the ISM band by using time resources or frequency resources as a solution for the case that a UE transmits and receives signals on a band adjacent to the ISM band, and is not a fundamental solution since the method is unable to solve the problem of the case that the harmonic component owing to a UE transmission influences on the ISM band in a situation that a UE transmission band is apart from the ISM band by a few hundred MHz or more.

Meanwhile, in case that the UE based on LTE/LTE-A performs a transmission on two UL carriers using the carrier aggregation (CA) technique, an intermodulation distortion component owing to a passive element such as a diplexer or a duplexer and an active element such as a power amplifier (PA) may interfere in the satellite navigation band and the ISM band. However, the researches for this have not been progressed previously.

Accordingly, the present specification has an object of researching influences on an interference exerted in the satellite navigation band and the ISM band by the harmonic component and the IMD component when performing a transmission by aggregating the UL of band 1 and the UL of band 5 shown in Table 2 using the CA technique by a UE, and has an object of providing the solution.

Hereinafter, the detailed researches and the solution according to this will be described.

First, examples of aggregating the UL of band 1 and the UL of band 5 using the CA technique will be arranged as follows.

TABLE 10

| E-UTRA CA band | E-UTRA band | UL band | | DL band | | Duplex mode |
|---|---|---|---|---|---|---|
| | | BS reception/UE transmission $F_{UL\_low}$-$F_{UL\_high}$ | Channel BW (MHz) | BS reception/UE transmission $F_{UL\_low}$-$F_{UL\_high}$ | Channel bandwidth (MHz) | |
| CA_1-5 | 1 | 1920 MHz-1980 MHz | 10 | 2110 MHz-2170 MHz | 10 | FDD |
| | 5 | 824 MHz-849 MHz | 10 | 869 MHz-894 MHz | 10 | |

In Table 10 above, the channel bandwidth are arranged as following Table 11.

TABLE 11

| | | E-UTRA band/Channel bandwidth | | | | | | |
|---|---|---|---|---|---|---|---|---|
| E-UTRA CA band | E-UTRA band | 1.4 MHz | 3 MHz | 5 MHz | 10 MHz | 15 MHz | 20 MHz | Bandwidth combination set |
| CA_1A-5A | 1 | | | | Yes | | | 0 |
| | 5 | | | | Yes | | | |

As shown above, in case of performing a transmission by aggregating the UL of band 1 and the UL of band 5, the harmonic component and the IMD component are analyzed and represented in Table 12 below.

First, referring to Table 12 below, since the frequency that generates the harmonic component is significantly far away from each frequency of band 1 and band 5 that a UE transmits and receives, it can be identified that the frequency does not exert influences directly on band 1 and band 5. However, the harmonic component influences on band 41.

The conventional spurious emission (SE) for the requirement for coexistence between UEs is designed on the assumption that the third-order harmonic component of band 5 influences on the DL of band 41. However, in case that each RB is located within the transmission bandwidth in which harmonic component of the second-order, the third-order or the fourth-order is partially or thoroughly overlapped with a measurement bandwidth, an exception for the SE measurement is allowed.

Further, referring to Table 12 below, since the frequency that generates the IMD component is significantly far away from each frequency of band 1 and band 5 that a UE transmits and receives, it can be identified that the frequency does not exert influences directly on band 1 and band 5. However, two-tone third-order IMD component influences on the DL of band 22, the DL of band 42, the DL of band 43 and the DL of band 4. However, since such band 22, band 42 and band 43 are significantly far away from band 1 and band 5, a front-end filter of a UE may remove the IMD component fully efficiently.

TABLE 12

| UE UL carrier | fx_low | fx_high | fy_low | fy_high |
|---|---|---|---|---|
| UL frequency (MHz) | 1920 | 1980 | 824 | 849 |
| $2^{nd}$ order harmonic frequency limitation | 2*fx_low | 2*fx_high | 2* fy_low | 2* fy_high |
| $2^{nd}$ order harmonic frequency limitation (MHz) | 3840 to 3960 | | 1648 to 1698 | |
| $3^{rd}$ order harmonic frequency limitation | 3*fx_low | 3*fx_high | 3* fy_low | 3* fy_high |
| $3^{rd}$ order harmonic frequency limitation (MHz) | 5760 to 5940 | | 2472 to 2547 | |
| $2^{nd}$ order IMD component | \|fy_low − fx_high\| | \|fy_high − fx_low\| | \|fy_low + fx_low\| | \|fy_high + fx_high\| |
| IMD frequency limitation (MHz) | 1071 to 1156 | | 2744 to 2829 | |
| Two-tone $3^{rd}$ order IMD component | \|2*fx_low − fy_high\| | \|2*fx_high − fy_low\| | \|2*fy_low − fx_high\| | \|2*fy_high − fx_low\| |
| IMD frequency limitation (MHz) | 2991 to 3136 | | 222 to 332 | |
| Two-tone $3^{rd}$ order IMD component | \|2*fx_low + fy_low\| | \|2*fx_high + fy_high\| | \|2*fy_low + fx_low\| | \|2*fy_high + fx_high\| |
| IMD frequency limitation (MHz) | 4664 to 4809 | | 3568 to 3678 | |

From Table 12 above, it can be identified that the third-order harmonic component generated when a UE transmits band 1 and band 5 by performing carrier aggregation influences on interferences in the Wi-Fi system which is operated in the ISM band.

Table 13 below represents that the harmonic component and the IMD component influence on the interference in the ISM band and the satellite navigation band, respectively.

TABLE 13

| Victim system influence by interference | Frequency band [MHz] | Whether to be influenced by interference | Region | Cause of interference |
|---|---|---|---|---|
| COMPASS (Beidou) | 1559-1591 | No | | |
| Galileo | 1559-1591 | No | | |
| GLONASS | 1591-1610 | No | | |
| GPS | 1563-1587 | No | | |
| ISM band (2.4 GHz) | 2400-2483.5 | Yes | US/Europe | $3^{rd}$ order harmonic of band 5 |
| | 2400-2494 | Yes | Asia | $3^{rd}$ order harmonic of band 5 |
| ISM band (5 GHz) | 5150-5925 | Yes | US | $3^{rd}$ order harmonic of band 1 |
| | 5150-5350 | No | Europe | |
| | 5470-5725 | No | | |
| | 5150-5825 | Yes | Asia | $3^{rd}$ order harmonic of band 1 and IMD |

As represented by Table 13 above, it can be identified that the third-order harmonic component of band 1 and the IMD, and the third-order harmonic component of band 5 interfere in the ISM band.

Accordingly, a method for mitigating the identified interference is required. For this, in the present specification, it may be considered to add a harmonic filter for removing the harmonic component generated when performing a transmission on a UL band to a UE. However, at the moment, the coupling problem owing to RF signals in a RF chain of a UE may influence on a reception of the ISM band.

Meanwhile, one thing to note is that the third-order harmonic component due to a transmission on the UL of band 1 and the third-order harmonic components due to a transmission on the UL of band 5 are also generated in a UE based on the conventional LTE (i.e., based on 3GPP release-8) that does not use the CA technique. However, when the UE based on the conventional LTE (i.e., based on 3GPP release-8) performs a transmission, it is observed that the harmonic component does not influence significantly on the ISM band. Through this observation, it is identified that the UE based on the conventional LTE is implemented such that the harmonic component does not interfere in the ISM band.

Accordingly, the present specification proposes not to add a filter that causes an additional insertion loss in comparison with the UE that performs a transmission only on one UL carrier for removing the harmonic component and the IMD component.

Alternately, since a performance degradation in the ISM band occurs owing to an interference leakage in case that a UE performs a transmission by aggregating two UL carriers (i.e., the UL of band 1 and the UL of band 5), the present specification proposes to add a filtering scheme such as a harmonic filter to a RF chain of the UE. This is because it is not required to consider the performance degradation in the ISM band owing to the IMD component since only the harmonic component is generated in case of the UE that performs a transmission only on one UL carrier, however, the performance degradation in the ISM band occurs since both of the harmonic component and the IMD component are generated in case of the UE that performs a transmission by aggregating two UL carriers (i.e., the UL of band 1 and the UL of band 5).

On the other hand, the present specification proposes a method to have only an insertion loss as much as a RF chain of a UE that performs a transmission only on one UL carrier, even though it is the RF chain of a UE that aggregates band 1 and band 5 (i.e., CA_1A-5A) using the CA technique.

Particularly, in order to perform a transmission using two UL carriers simultaneously, a diplexer is required to a RF chain. However, an insertion loss is caused by the diplexer, and this influences on the maximum output power and the reference sensitivity level of reception. An amount of the insertion loss caused by the diplexer is different for manufacturers, and may be arranged as Table 14 below.

TABLE 14

| E-UTRA band | IL (dB) | IL (dB) | IL (dB) | IL (dB) | IL (dB) |
|---|---|---|---|---|---|
| 1 | 0.38 | 0.66 | 0.53 | 0.41 | 0.45 |
| 5 | 0.36 | 0.49 | 0.45 | 0.35 | 0.3 |

IL in Table 14 above is an abbreviation for Insertion Loss, and the unit is expressed by dB.

There may be no margin difference in the path of transmission (TX)/reception (Rx) for the insertion loss (IL) values that are arranged as above. Therefore, an average of the insertion loss (IL) may be represented by $\overline{IL}$ as below Table 15.

TABLE 15

| | Inter-band CA configuration | | |
|---|---|---|---|
| | E-UTRA band | Tx IL [dB] | Rx IL [dB] |
| $\overline{IL}$ | 1 | 0.49 | 0.49 |
| | 5 | 0.39 | 0.39 |

If the insertion loss is as shown in Table 14 and the average value of this is as shown in Table 15, when calculating a reference sensitivity that a UE is actually available to use, a degradation of the reference sensitivity is inevitable by using the values shown in Table 15 above as it is.

Here, the mentioned reference sensitivity is a value that represents a reference reception power that a UE is available to receive data stably, and is a reference to determine a cell radius in case that a mobile communication service provider disposes a cell on a specific frequency. When a radio wave is radiated from a BS in a regular power, the radio wave reaches to a UE reception antenna after going through attenuation. At the moment, the radio wave is attenuated in different shape according to a free space, a downtown and a rural area, and the attenuation in the free space is as following Equation 2.

In an ideal free space propagation model, an energy decrease due to RF signals from a transmitting end to a receiving end follows the inverse square law. That is, the signal power measured in the receiving end is inversely proportional to a square of distance for the signal power transmitted from the transmitting end.

$$P_{RX} = P_{TX}G_{TX}G_{RX}\left(\frac{\lambda}{4\pi d}\right)^2 = \frac{P_{TX}G_{TX}G_{RX}}{L_s(d)} \quad \text{[Equation 2]}$$

In Equation 2, $P_{TX}$ represents a transmission power, $G_{TX}$ represents a transmission antenna gain, $G_{RX}$ is a reception antenna gain, λ (Lambda) represents a wavelength, and d represents a distance between transmitter-receiver, and λ (d) is a function that represents an attenuation amount of the RF signal power according to a distance. A modeling of the radio channel between a transmitting end and a receiving end is performed as a summation of an attenuation of average transmission power owing to shadowing, etc. and sequential fast fading. The average path loss $\overline{L}_p(d)$ may be expressed as following Equation 3.

$$\overline{L}_p(d) = L_s(d_0) + 10n\log\left(\frac{d}{d_0}\right) \text{ (dB)} \quad \text{[Equation 3]}$$

Under the background as such, the case of urban macro model used in a general standard will be described. At the moment, a path loss is as follows.

PL=40 log$_{10}$($d_1$)+7.8−18 log$_{10}$($h_{BS}$)−18.0 log$_{10}$($h_{UT}$)+2.0 log$_{10}$($f_c$)     [Equation 4]

Here, PL is a path loss, $d_1$ is a distance between transmitter/receiver in meter unit, $h_{BS}$ is a height of BS in meter unit, $h_{UT}$ is a height of UE in a meter unit, and $f_c$ is a center frequency in Hz unit.

Assuming a path loss of 140 dB at a center frequency of 2 GHz, a height of BS of 25 m and a height of UE of 1.5 m, a cell radius is about 3.5 km, and assuming a BS transmission power of 43 dBm (20 W), reception of a reference sensitivity level signal of −97 dBm may be assumed.

Here, when applying an insertion loss of 0.4 dB, for example, the path loss is decreased as PL=140−0.4=139.6 dB, and when substituting this to the equation above, reduction of cell radius occurs as much as 80 m in comparison with the existing 3.5 km. This corresponds to a value that a cell radius is reduced about 2% in comparison with the existing 3.5 km. Accordingly, in order to avoid the reduction of cell radius in an aspect of mobile communication service provider, it is required to minimize the insertion loss value according to a simultaneous transmission performed by aggregating two UL carriers.

However, since it is very hard to decrease the insertion loss actually, the problem may be solved by decreasing a margin for the reference sensitivity at a UE end, instead. Conventionally, the reference sensitivity of an actual UE has a margin of 4 to 6 dB in comparison with the minimum requirement requested in the standard. Accordingly, the additional insertion loss of 0.4 dB at a receiving end may be configured to 0 dB by decreasing the margin of reference sensitivity, and according to this, an influence on the UE end may be decreased by removing the cell radius reduction and the decrease of the margin about 10%.

In other words, since there exists some implementation margin in the reference sensitivity that is secured when implementing at the UE end, an allowed reference sensitivity relaxation, that is, $\Delta R_{IB,c}$ may become 0 dB by yielding a margin of the reference sensitivity. The $\Delta R_{IB,c}$ may be arranged as Table 16 below.

TABLE 16

| | Inter-band CA configuration | |
|---|---|---|
| | E-UTRA band | $\Delta R_{IB}$ [dB] |
| CA_1A-5A | 1 | 0 |
| | 5 | 0 |

That is, as represented in Table 16 above, the allowed reference sensitivity relaxation according to the support of inter-band CA operation in serving cell c of the corresponding band, that is, $\Delta R_{IB,c}$ may be 0 dB.

On the other hand, if the insertion loss is as shown in Table 14 and the average value of this is as shown in Table 15, when calculating the maximum power Pcmax that a UE is actually available to use, a degradation of the maximum power is inevitable by using the values shown in Table 16 above as it is. Here, first, the transmission power will be described below in case that a UE supports an inter-band CA.

$$P_{CMAX\_L,c} \leq P_{CMAX,c} \leq P_{CMAX\_H,c} \quad \text{[Equation 5]}$$

Here, it may be expressed that $P_{CMAX\_L,c}$=MIN {$P_{EMAX,c}-\Delta T_{C,c}$, $P_{PowerClass}$−MAX(MPR$_c$+A-MPR$_c$+$\Delta T_{IB,c}$+$\Delta T_{C,c}$, P-MPR$_c$)}, and $P_{CMAX\_H,c}$=MIN {$P_{EMAX,c}$, $P_{PowerClass}$}.

Here, $P_{EMAX,c}$ is the maximum power which is provided for serving cell c. And $P_{PowerClass}$ is the maximum UE power in which a tolerance is not considered, is −23 dBm. And MPR$_c$ and A-MPR$_c$ are MPR and A-MPR provided for serving cell C. In addition, $\Delta T_{IB,c}$ is an additional tolerance for an inter-band CA which is provided for serving cell C. Here, $\Delta T_{C,c}$=1.5 dB, $\Delta T_{C,c}$=0 dB. The P-MPR$_c$ is MPR for the case that a simultaneous transmission is performed on multiple radio access technology (RAT).

Accordingly, the reduction of maximum power owing to the insertion loss described above leads to a reduction of cell coverage, eventually.

Therefore, the reduction of maximum power owing to the insertion loss may be absorbed by +−2 dB which is a margin of the maximum output power. Particularly, since there exists some implementation margin in the maximum power that is secured when implementing at the UE end, an inter-band tolerance in serving cell c within the corresponding band, that is, $\Delta T_{IB,c}$ may be 0.3 dB by yielding the margin of the maximum power. The $\Delta T_{IB,c}$ may be arranged as Table 17 below.

TABLE 17

| | Inter-band CA configuration | |
|---|---|---|
| | E-UTRA band | $\Delta T_{IB,c}$ [dB] |
| CA_1A-5A | 1 | 0.3 |
| | 5 | 0.3 |

That is, in case of performing a simultaneous transmission through the UL of band 1 and the UL of band 5 as represented in Table 17 above, the inter-band tolerance of inter-band CA operation in serving cell c of the corresponding band, that is, $\Delta T_{IB,c}$ may be 0.3 dB.

FIG. 17A to FIG. 17D illustrate RF chain structures of a UE to which a filter for removing or suppressing the harmonic or the IMD is added, respectively.

Figure 17A:
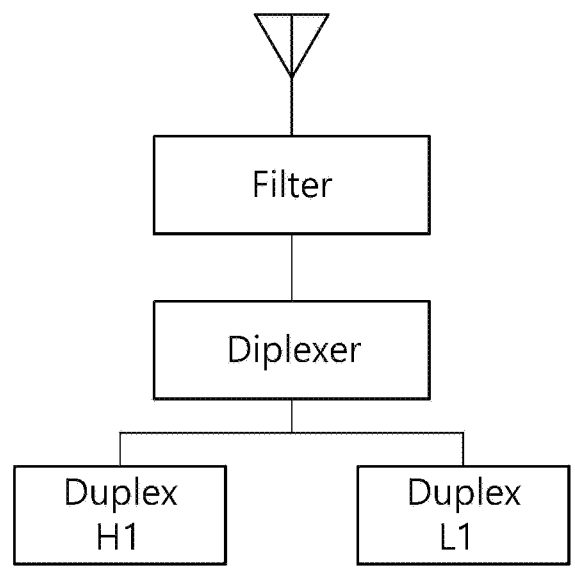
FIG. 17A to FIG. 17D illustrate RF chain structures of a UE to which a filter for removing or suppressing the harmonic or the IMD is added, respectively.

FIG. 17A illustrates an exemplary RF chain structure of a UE. An antenna is connected to the filter that removes/suppresses the harmonic and the IMD. The filter is connected to a diplexer for distinguishing high frequency/low frequency bands. The diplexer is connected to a duplexer for a first low frequency L1 (e.g., band 5) and a duplexer for a first high frequency H1 (e.g., band 1). Each of the duplexers divides a transmission and a reception. Accordingly, as described above, the filter removes or suppresses a leakage component that the harmonic component and the IMD component generated in case that the low frequency (e.g., band 5) and the high frequency (e.g., band 1) are simultaneously used for a transmission by the CA is radiated through the antenna or is going into the antenna via an RF board within the UE.

Figure 17B:
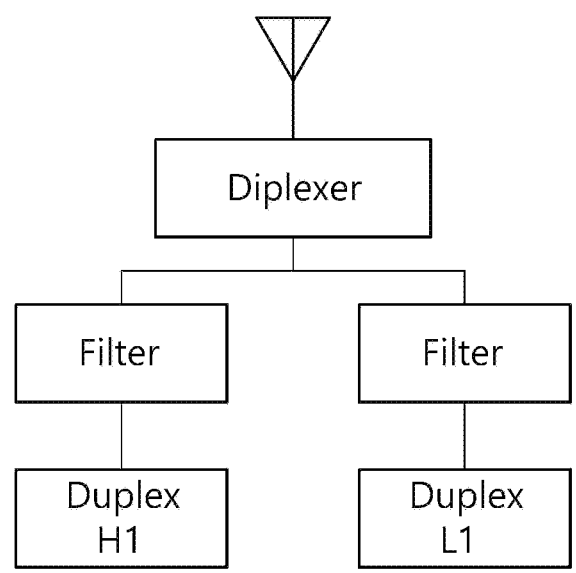

FIG. 17B illustrates another exemplary RF chain structure of a UE.

An antenna is connected to a diplexer and the diplexer is connected to a filter. The filter is connected to a duplexer for a first low frequency L1 (e.g., band 5) and a duplexer for a first high frequency H1 (e.g., band 1). Each of the duplexers divides a transmission and a reception. As described above, the filter removes or suppresses the harmonic component and the IMD component generated in case that the low frequency (e.g., band 5) and the high frequency (e.g., band 1) are simultaneously used for a transmission by the CA.

Figure 17C:
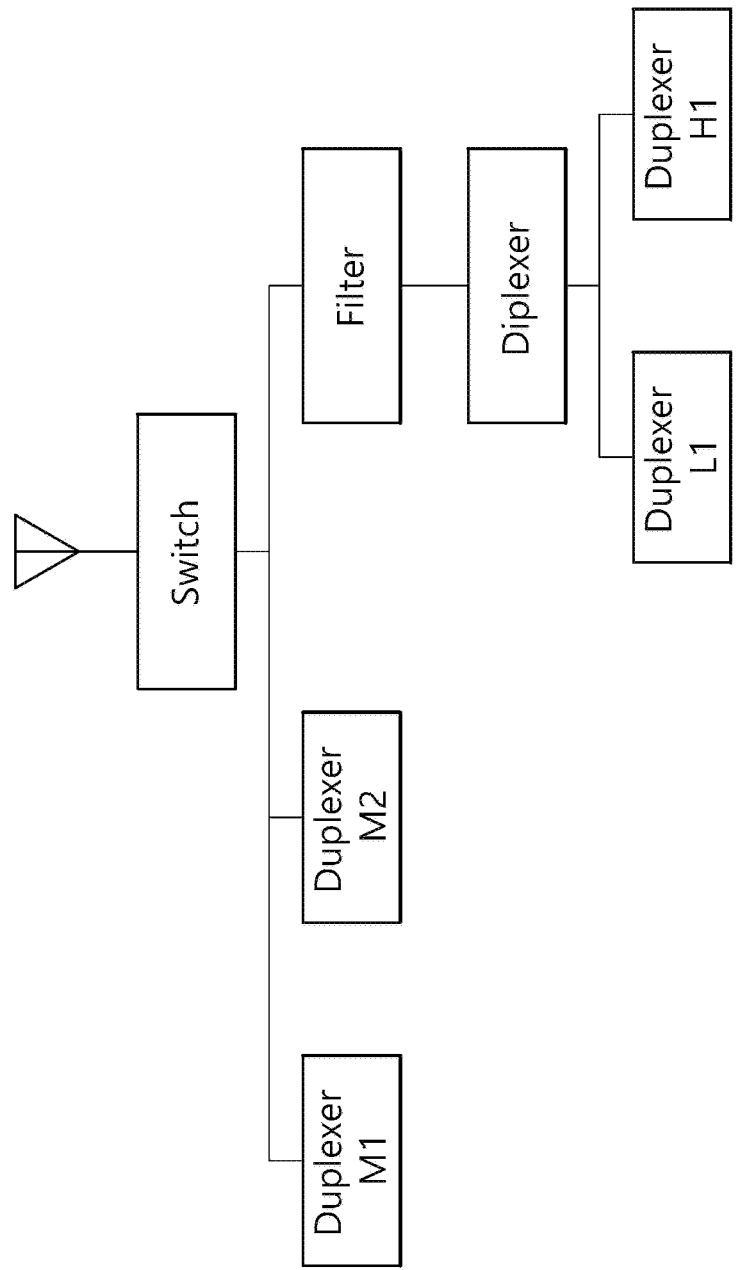

FIG. 17C illustrates still another exemplary RF chain structure of a UE.

An antenna is connected to a switch, and the switch is connected to a duplexer for a first middle frequency band M1, a duplexer for a second middle frequency band M2 and a filter. The filter is connected to duplexers for low frequency/high frequency band. Each of the duplexers divides a transmission and a reception. The switch is coupled with the antenna by dividing middle frequency M1 and M2 and low frequency/high frequency band. Between the switch and the diplexer, the filter is added according to an embodiment of the present specification. Accordingly, as described above, the filter removes or suppresses a leakage component that the harmonic component and the IMD component generated in case that the low frequency (e.g., band 5) and the high frequency (e.g., band 1) are simultaneously used for a transmission by the CA is radiated through the antenna or is going into the antenna via an RF board within the UE.

Figure 17D:
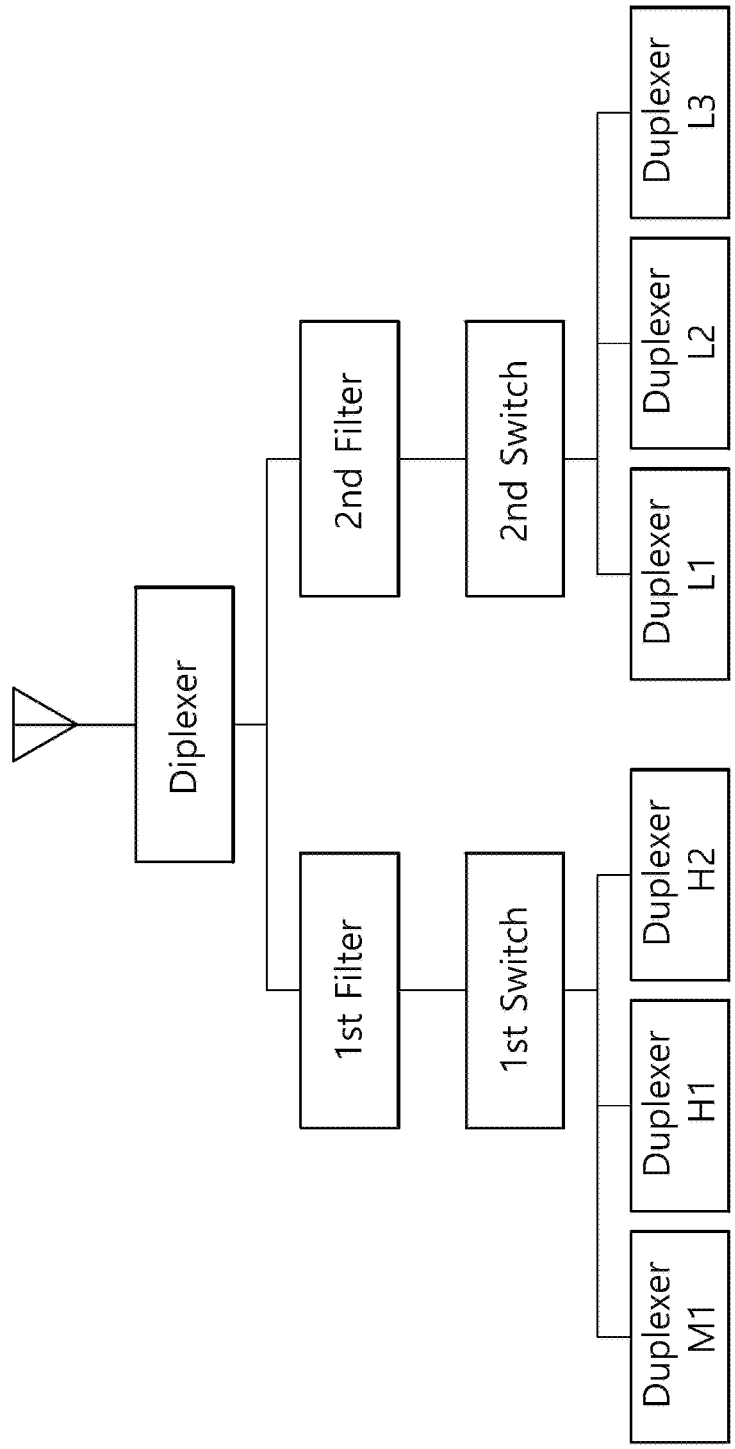

FIG. 17D illustrates a RF chain structure of a UE for multiple CAs. An antenna is connected to a duplexer, and the duplexer is coupled with the antenna by dividing middle frequency/high frequency band and low frequency band. The duplexer is connected to a first filter and a second filter that are added according to an embodiment of the present specification. A first switch and a second switch are connected to the respective filters. The first switch is connected to a duplexer for a first middle frequency band M1, a duplexer for a first high frequency band H1 and a duplexer for a second high frequency band H2, and is coupled with the first filter depending on a situation. The second switch is connected to a duplexer for a first low frequency band L1, a duplexer for a second low frequency band L2 and a duplexer for a third low frequency band L3, and is coupled with the second filter depending on a situation. Each of the duplexers divides a transmission and a reception.

Accordingly, as described above, each of the filters remove or suppress the harmonic component and the IMD component generated in case that the low frequency (e.g., band 5) and the high frequency (e.g., band 1) are simultaneously used for a transmission by the CA.

As shown in FIG. 17A to FIG. 17D, through the filter which is added according to an embodiment of the present invention, by removing the harmonic component and the IMD component generated when performing a transmission by aggregating the UL of band 1 and the UL of band 5, influences from interference exerted in the satellite navigation band and the ISM band may be minimized. However, as described above, the insertion loss that occurs by adding the filter is absorbed in the margin of reference sensitivity in case of a reception, thereby preventing from a reduction of cell coverage, and absorbed in +−2 dB which is the margin of maximum output power of a UE in case of a transmission, thereby preventing from a reduction of cell coverage.

According to firmware or software implementation, the method according to the embodiments of the present invention may be implemented in the form of a module, a procedure or a function to perform the above functions or operation. A software code is stored in a memory unit so that the software code may be driven by a processor. The memory unit may be located inside or outside the processor to exchange data with the processor by various know means. The wireless communication system according to an embodiment of the present invention will be described with reference to FIG. 18.

Figure 18:
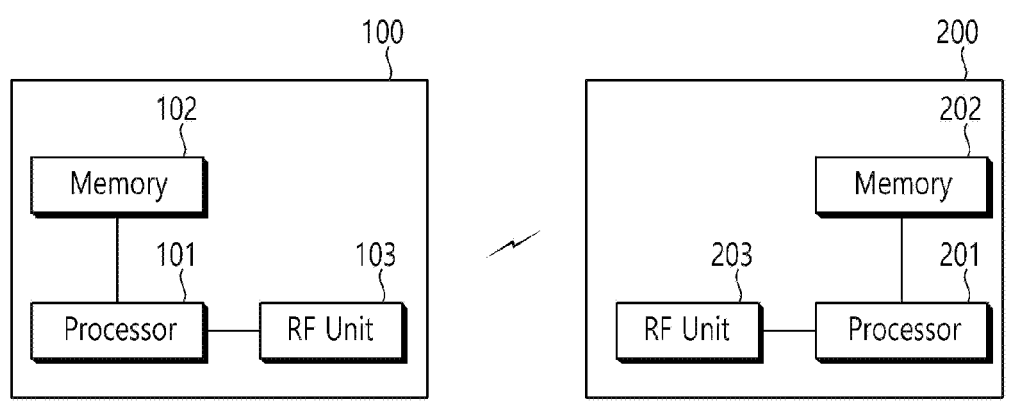
FIG. 18 is a block diagram illustrating a wireless communication system according to an embodiment of the present invention.

FIG. 18 is a block diagram illustrating a wireless communication system according to an embodiment of the present invention.

A base station 200 includes a processor 201, a memory 202, and a radio frequency (RF) unit 203. The memory 202 is connected to the processor 201 to store various information for driving the processor 201. The RF unit 203 is connected to the processor 201 to transmit and/receive a wireless signal. The processor 201 implements a suggested function, procedure, and/or method. An operation of the base station 200 according to the above embodiment may be implemented by the processor 201.

A wireless device 100 includes a processor 101, a memory 102, and an RF unit 103. The memory 102 is connected to the processor 101 to store various information for driving the processor 101. The RF unit 103 is connected to the processor 101 to transmit and/receive a wireless signal. The processor 101 implements a suggested function, procedure, and/or method. An operation of the wireless 100 according to the above embodiment may be implemented by the processor 201.

A processor may include an application-specific integrated circuit (ASIC), another chipset, a logic circuit, and/or a data processor. A memory may include read-only memory (ROM), random access memory (RAM), a flash memory, a memory card, a storage medium, and/or other storage devices. An RF unit may include a baseband circuit to process an RF signal. When the embodiment is implemented, the above scheme may be implemented by a module (procedure, function, and the like) to perform the above function. The module is stored in the memory and may be implemented by the processor. The memory may be located inside or outside the processor, and may be connected to the processor through various known means.

In the above exemplary system, although methods are described based on a flowchart including a series of steps or blocks, the present invention is limited to an order of the steps. Some steps may be generated in the order different from or simultaneously with the above other steps. Further, it is well known to those skilled in the art that the steps included in the flowchart are not exclusive but include other steps or one or more steps in the flowchart may be eliminated without exerting an influence on a scope of the present invention.

What is claimed is:

1. A terminal, comprising:
a middle frequency band duplexer configured to separate a transmission and a reception on a carrier of a middle frequency band;
a plurality of high frequency band duplexers configured to separate a transmission and a reception on carriers of a plurality of high frequency bands;
a plurality of low frequency band duplexers configured to separate a transmission and a reception on carriers of a plurality of low frequency bands;
a first switch configured to selectively couple one of the middle frequency band duplexer and one of the plurality of high frequency band duplexers to a first filter to output a first selected carrier from the first filter,
wherein the first selected carrier is a carrier among the carrier of the middle frequency band and the carriers of the plurality of high frequency bands;
a second switch configured to selectively couple one of the plurality of low frequency duplexers to a second filter to output a second selected carrier from the second filter,
wherein the second selected carrier is a carrier among the carriers of the plurality of low frequency bands;
an antenna; and
a diplexer connected to the antenna, wherein the diplexer is configured to:
  combine the first selected carrier and the second selected carrier into combined selected carriers, and selectively output the combined selected carriers to the antenna, and
wherein the first filter and the second filter remove a harmonic component and an intermodulation distortion (IMD) component generated in case that a transmission on the first selected carrier and a transmission on the second selected carrier are simultaneously performed.

2. The terminal of claim 1, wherein the second selected carrier is band 5 based on long term evolution (LTE)/advanced LTE (LTE-A), and the first selected carrier is band 1 based on LTE/LTE-A.

3. The terminal of claim 1, wherein the first filter and the second filter remove the harmonic component and the IMD component causing an interference in a wireless local area network (WLAN) that uses an industrial scientific medical (ISM).

4. The terminal of claim 1, wherein an insertion loss caused by the first filter and the second filter is absorbed in a margin of reference sensitivity in case of a reception and is absorbed in a margin of maximum output power in case of a transmission, whereby a reduction of cell coverage is prevented.

5. A terminal, comprising:
a plurality of middle frequency band duplexers configured to separate a transmission and a reception on carriers of a plurality of middle frequency bands;
a switch;
a diplexer configured to separate and synthesize a carrier of a low frequency band and a carrier of a high frequency band;
a filter connected between the switch and the diplexer;
a low frequency band duplexer connected to the diplexer, the low frequency band duplexer configured to separate a transmission and a reception on the carrier of the low frequency band;
a high frequency band duplexer connected to the diplexer, the high frequency band duplexer configured to separate a transmission and a reception on the carrier of the high frequency band; and
an antenna coupled to the switch,
wherein the switch is configured to selectively couple one of the plurality of middle frequency band duplexers or the filter to the antenna, and
wherein the filter removes a harmonic component and an intermodulation distortion (IMD) component generated in case that a transmission on the carrier of the low frequency band and a transmission on the carrier of the high frequency band are simultaneously performed.

6. The terminal of claim 5, wherein the carrier of the low frequency band is band 5 based on long term evolution (LTE)/advanced LTE (LTE-A), and the carrier of the high frequency band is band 1 based on LTE/LTE-A.

7. The terminal of claim 5, wherein the filter removes the harmonic component and the IMD component causing an interference in a wireless local area network (WLAN) that uses an industrial scientific medical (ISM).

8. The terminal of claim 5, wherein an insertion loss caused by the filter is absorbed in a margin of reference sensitivity in case of a reception and is absorbed in a margin of maximum output power in case of a transmission, whereby a reduction of cell coverage is prevented.

* * * * *